US012610248B2

(12) United States Patent
Kawai et al.

(10) Patent No.:  US 12,610,248 B2
(45) Date of Patent:  Apr. 21, 2026

(54) RADIO WAVE MAP PROVISION DEVICE, AND RADIO WAVE MAP ACQUISITION USAGE DEVICE

(71) Applicant: DENSO CORPORATION, Kariya-city (JP)

(72) Inventors: Shigeki Kawai, Kariya-city (JP); Daiki Maemoto, Kariya-city (JP); Tsuneo Nakata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 498 days.

(21) Appl. No.: 18/333,208

(22) Filed: Jun. 12, 2023

(65) Prior Publication Data

US 2023/0328537 A1      Oct. 12, 2023

Related U.S. Application Data

(63) Continuation of application No. PCT/JP2021/035927, filed on Sep. 29, 2021.

(30) Foreign Application Priority Data

Dec. 14, 2020    (JP) ................................. 2020-207129

(51) Int. Cl.
*H04W 16/18* (2009.01)
(52) U.S. Cl.
CPC ................................... *H04W 16/18* (2013.01)
(58) Field of Classification Search
CPC ......... H04W 16/18; H04W 4/44; H04W 4/02; H04W 64/006
See application file for complete search history.

(56) References Cited

U.S. PATENT DOCUMENTS

| | | | |
|---|---|---|---|
| 2009/0209282 A1 | 8/2009 | Kobayashi et al. | |
| 2015/0072696 A1 | 3/2015 | Nakata | |
| 2017/0018190 A1* | 1/2017 | Yamasaki | ............. H04W 4/029 |
| 2018/0255466 A1 | 9/2018 | Nakata | |

(Continued)

FOREIGN PATENT DOCUMENTS

| | | |
|---|---|---|
| JP | 2015056678 A | 3/2015 |
| JP | 2017216645 A | 12/2017 |

*Primary Examiner* — Tejis Daya
(74) *Attorney, Agent, or Firm* — Harness, Dickey & Pierce, P.L.C.

(57) ABSTRACT

A radio wave map provision device includes a radio wave map storage that stores a radio wave map. The radio wave map includes reference position information indicating a reference position, a communication speed with each external communication device at the reference position, and a connection probability indicating a probability of performing wireless communication with each external communication device at the reference position. The radio wave map provision device: receives the radio wave map request including request position information indicating a request position; obtains a lowest guaranteed speed and an estimated speed, at the reference position, based on the communication speed and the connection probability; and transmits a radio wave map reply including the connection probability, the lowest guaranteed speed, and the estimated speed, at the reference position corresponding to the request position information.

21 Claims, 17 Drawing Sheets

| POSITION (LATITUDE AND LONGITUDE) | TIME PERIOD | CONNECTION BASE STATION | COMMUNI-CATION SPEED | CONNECTION PROBABILITY WITH BASE STATION |
|---|---|---|---|---|
| o (34.9910, 137.014) | 9:00-12:00 | BASE STATION A | 1.4Mbps | 1.0 |
| p (34.9915, 137.009) | 9:00-12:00 | BASE STATION A | 1.5Mbps | 0.7 |
| p (34.9915, 137.009) | 9:00-12:00 | BASE STATION B | 0.9Mbps | 0.3 |
| q · · · | · · · | BASE STATION A | · · · | · · · |
| r · · · | · · · | BASE STATION A | · · · | · · · |
| r · · · | · · · | BASE STATION B | · · · | · · · |
| r · · · | · · · | BASE STATION C | · · · | · · · |

(56) References Cited

U.S. PATENT DOCUMENTS

2019/0090139 A1*  3/2019  Nakata .................. H04W 4/029
2020/0221349 A1*  7/2020  Nakata .................... H04W 4/44
2021/0070317 A1*  3/2021  Hitotsumatsu ..... G01C 21/3461

* cited by examiner

5: RADIO WAVE MAP SERVER DEVICE

FIG. 5A

| POSITION (LATITUDE AND LONGITUDE) | TIME PERIOD | CONNECTION BASE STATION | COMMUNI-CATION SPEED | CONNECTION PROBABILITY WITH BASE STATION |
|---|---|---|---|---|
| o (34.9910, 137.014) | 9:00-12:00 | BASE STATION A | 1.4Mbps | 1.0 |
| p (34.9915, 137.009) | 9:00-12:00 | BASE STATION A | 1.5Mbps | 0.7 |
| p (34.9915, 137.009) | 9:00-12:00 | BASE STATION B | 0.9Mbps | 0.3 |
| q · · · | · · · | BASE STATION A | · · · | · · · |
| r · · · | · · · | BASE STATION A | · · · | · · · |
| r · · · | · · · | BASE STATION B | · · · | · · · |
| r · · · | · · · | BASE STATION C | · · · | · · · |

FIG. 5B

| RADIO WAVE INTENSITY (RSRP[dBm]) | DOWNLINK COMMUNICATION SPEED [Mbps] | UPLINK COMMUNICATION SPEED [Mbps] |
|---|---|---|
| −60dBm OR MORE | 15 | 30 |
| −70dBm OR MORE   LESS THAN −60dBm | 10 | 20 |
| −80dBm OR MORE   LESS THAN −70dBm | 8 | 15 |
| −90dBm OR MORE   LESS THAN −80dBm | 6 | 10 |
| −100dBm OR MORE   LESS THAN −90dBm | 4 | 7 |
| −110dBm OR MORE   LESS THAN −100dBm | 2 | 5 |
| LESS THAN −110dBm | 1 | 1 |

FIG. 6

| POSITION (LATITUDE AND LONGITUDE) | TIME PERIOD | CONNECTION BASE STATION | LOWEST GUARANTEED SPEED | ESTIMATED SPEED | CONNECTION PROBABILITY |
|---|---|---|---|---|---|
| . . . | . . . | . . . | . . . | . . . | . . . |
| p | 9:00-12:00 | BASE STATION A | 0.9 Mbps | 1.5 Mbps | 0.7 |
| p | 9:00-12:00 | BASE STATION B | | | 0.3 |
| . . . | . . . | . . . | . . . | . . . | . . . |

100: PROBE INFO
TRANSMISSION DEVICE

200: RADIO WAVE MAP
GENERATION DEVICE

START

ACQUIRE POSITION INFO — S101

ACQUIRE
PROPAGATION
ENVIRONMENT INFO — S102

ACQUIRE EXTERNAL
COMMUNICATION DEVICE
IDENTIFICATION INFO — S103

S104

TRANSMIT PROBE INFO

END

START

RECEIVE AND STORE
PROBE INFO — S201

CALCULATE
COMMUNICATION SPEED — S202

CALCULATE
CONNECTION PROBABILITY — S203

STORE — S204

END

<u>5: RADIO WAVE MAP SERVER DEVICE</u>

5: RADIO WAVE MAP SERVER DEVICE

5: RADIO WAVE MAP SERVER DEVICE

RADIO WAVE MAP PROVISION DEVICE, AND RADIO WAVE MAP ACQUISITION USAGE DEVICE

CROSS REFERENCE TO RELATED APPLICATIONS

The present application is a continuation application of International Patent Application No. PCT/JP2021/035927 filed on Sep. 29, 2021, which designated the U.S. and claims the benefit of priority from Japanese Patent Application No. 2020-207129 filed on Dec. 14, 2020. The entire disclosures of all of the above applications are incorporated herein by reference.

TECHNICAL FIELD

The present disclosure relates to a radio wave map provision device mainly implemented by a server, and also relates to a radio wave map acquisition usage device, which is implemented by a moving object or a distribution server and utilizes a radio wave map provided by the radio wave map provision device. The present disclosure also relates to methods executed by these devices and program products executable by these devices.

BACKGROUND

With the spread of wireless communication, opportunities to perform communication using wireless communication at various places are increasing. In particular, attention is paid to a technique for performing driver assistance or autonomous driving control in a moving object such as an automobile using a high-capacity cellular communication, V2X communication such as vehicle-to-vehicle communication and road-to-vehicle communication, and the like. As a result, a vehicle has a communication function, and a so-called connectivity of the vehicle is progressing.

SUMMARY

The present disclosure provides a radio wave map provision device. The radio wave map provision device includes a radio wave map storage that stores a radio wave map, which includes reference position information indicating a reference position, a communication speed with each external communication device at the reference position, and a connection probability indicating a probability of performing wireless communication with each external communication device at the reference position. The radio wave map provision device: receives the radio wave map request including request position information indicating a request position; obtains a lowest guaranteed speed and an estimated speed, at the reference position, based on the communication speed and the connection probability; and transmits a radio wave map reply including the connection probability, the lowest guaranteed speed, and the estimated speed, at the reference position corresponding to the request position information.

BRIEF DESCRIPTION OF DRAWINGS

Objects, features and advantages of the present disclosure will become apparent from the following detailed description made with reference to the accompanying drawings.

FIG. 5A and FIG. 5B are diagrams each illustrating a radio wave map generated in the first embodiment of the present disclosure.

FIG. 6 is a diagram illustrating a radio wave map provided in the first embodiment of the present disclosure.

DETAILED DESCRIPTION

Figure 1:
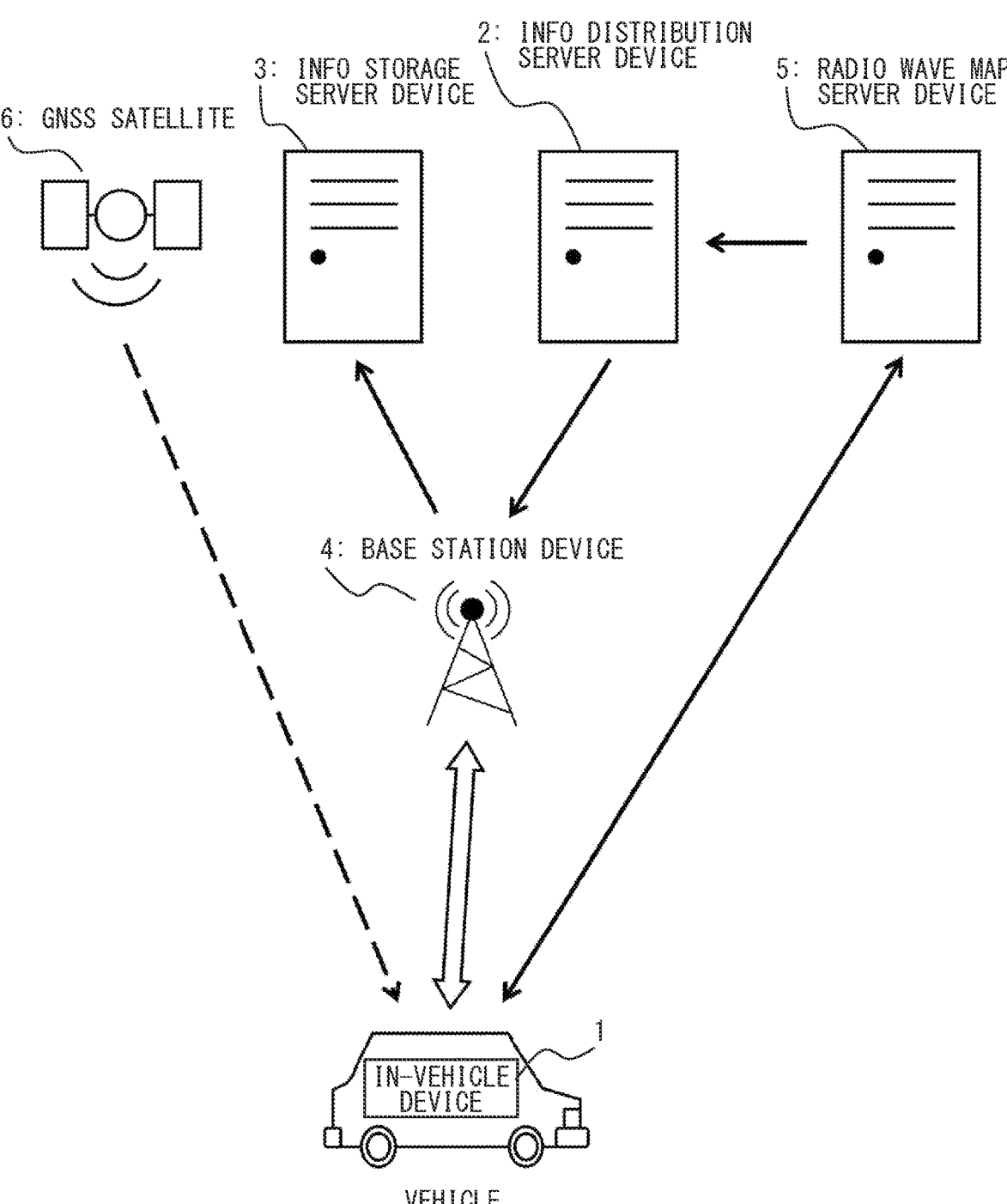
FIG. 1 is an overall configuration diagram illustrating devices used in embodiments of the present disclosure and a mutual relation therebetween.

When a high-capacity cellular communication is used, a terminal device mounted on the moving object performs wireless communication with a base station device, but when the moving object is located in the vicinity of a boundary between two base station devices, frequent switching between the two base station devices may occur.

For example, a technique is known for reducing the occurrence of switching between base station devices that establish wireless communication with a terminal device.

The present inventors have found out the following difficulties as a result of detailed studies on the known art.

The known technique can reduce an occurrence frequency of switching between the base station device, but cannot prevent the switching itself between the base station devices. In addition, in order to continue communication by the terminal device mounted on the moving object, it is necessary to switch the base station devices that perform wireless communication with movement, that is, to perform so-called handover. If so, it is necessary to perform communication control on the premise that communication becomes unstable when the base station devices are switched.

According to an aspect of the present disclosure, a radio wave map provision device receives a radio wave map request from a radio wave map acquisition usage device, and transmits necessary information. The radio wave map provision device includes a radio wave map storage unit, a receiving unit, a lowest guaranteed speed calculation unit, an estimated speed calculation unit, and a transmission unit. The radio wave map storage unit stores a radio wave map. The radio wave map includes reference position information indicating a reference position, a communication speed with each of a plurality of external communication devices at the reference position, and a connection probability indicating a probability of performing wireless communication with each of the plurality of external communication devices at the reference position. The receiving unit receives the radio wave map request including request position information indicating a request position. The lowest guaranteed speed calculation unit obtains a lowest guaranteed speed at the reference position based on the communication speed and the connection probability. The estimated speed calculation unit obtains an estimated speed at the reference position based on the communication speed and the connection probability. The transmission unit transmits a radio wave map reply including the connection probability, the lowest guaranteed speed, and the estimated speed, at the reference position corresponding to the request position information.

According to another aspect of the present disclosure, a radio wave map acquisition usage device includes a request position information acquisition unit, a transmission unit, a receiving unit, an unstable region determination unit, a communication control unit, and a wireless communication unit. The request position information acquisition unit acquires request position information indicating a request position. The transmission unit transmits a radio wave map request including the request position information to a radio wave map provision device. The receiving unit receives a radio wave map reply from the radio wave map provision device. The radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the plurality of external communication devices at the reference position, and an estimated speed at the reference position obtained based on the communication speed and the connection probability. The unstable region determination unit determines whether the reference position is in an unstable region based on the connection probability. The communication control unit controls the wireless communication with each of the plurality of external communication devices based on a determination result of the unstable region determination unit. The wireless communication unit transmits data by performing the wireless communication with the plurality of external communication devices.

According to another aspect of the present disclosure, a radio wave map provision method executed by a radio wave map provision device is provided. The radio wave map provision device receives a radio wave map request from a radio wave map acquisition usage device and transmits necessary information. The radio wave map provision device includes a radio wave map storage unit that stores a radio wave map. The radio wave map includes reference position information indicating a reference position, a communication speed with each of a plurality of external communication devices at the reference position, and a connection probability indicating a probability of performing wireless communication with each of the plurality of external communication devices at the reference position. The radio wave map provision method includes: receiving the radio wave map request including request position information indicating a request position; obtaining a lowest guaranteed speed at the reference position based on the communication speed and the connection probability; obtaining an estimated speed at the reference position based on the communication speed and the connection probability; and transmitting a radio wave map reply including the connection probability, the lowest guaranteed speed, and the estimated speed, at the reference position corresponding to the request position information.

According to another aspect of the present disclosure, a radio wave map acquisition usage method executed by a radio wave map acquisition usage device is provided. The radio wave map acquisition usage method includes: acquiring request position information indicating a request position; transmitting a radio wave map request including the request position information to a radio wave map provision device; receiving a radio wave map replay from the radio wave map provision device, wherein the radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the plurality of external communication devices at the reference position, and an estimated speed at the reference position obtained based on the communication speed and the connection probability; determining whether the reference position is in an unstable region based on the connection probability; controlling the wireless communication with each of the plurality of external communication devices based on a determination result; and transmitting data by performing the wireless communication with the plurality of external communication devices.

According to another aspect of the present disclosure, a radio wave map provision program executable by a radio wave map provision device is provided. The radio wave map provision device receives a radio wave map request from a radio wave map acquisition usage device and transmits necessary information. The radio wave map provision device includes a radio wave map storage unit that stores a radio wave map. The radio wave map includes reference position information indicating a reference position, a communication speed with each of a plurality of external communication devices at the reference position, and a connection probability indicating a probability of performing wireless communication with each of the plurality of external communication devices at the reference position. The radio wave map provision program includes instructions for: receiving the radio wave map request including request position information indicating a request position; obtaining a lowest guaranteed speed at the reference position based on the communication speed and the connection probability; obtaining an estimated speed at the reference position based on the communication speed and the connection probability; and transmitting a radio wave map reply including the connection probability, the lowest guaranteed speed, and the estimated speed, at the reference position corresponding to the request position information.

According to another aspect of the present disclosure, a radio wave map acquisition usage program executable by a radio wave map acquisition usage device is provided. The radio wave map acquisition usage program includes instructions for: acquiring request position information indicating a request position; transmitting a radio wave map request including the request position information to a radio wave map provision device; receiving a radio wave map reply from the radio wave map provision device, wherein the radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the external communication devices at the reference position, and an estimated speed at the reference position obtained based on the communication speed and the connection probability; determining whether the reference position is in an unstable region based on the connection probability; controlling the wireless communication with each of the plurality of external communication devices based on a determination result; and transmitting data by performing the wireless communication with the plurality of external communication devices.

With the above-described configuration, the information necessary for determining the unstable region can be provided as the radio wave map. Thus, information necessary for determining whether a position at which wireless communication is performed is in an unstable region at which a base station device may be switched can be provided as the radio wave map.

In addition, with the above-described configuration, it is possible to determine, using the radio wave map, whether the position at which the wireless communication is performed is in the unstable region, and perform the appropriate communication control corresponding to the determination result.

The following will describe embodiments of the present disclosure with reference to the drawings.

Effects described in the embodiments are effects when the configurations of the embodiments are provided as examples of the present disclosure, and are not necessarily effects of the present disclosure.

When there are multiple embodiments, the configurations disclosed in the embodiments are not limited to the embodiments, and can be combined across the embodiments. For example, a configuration disclosed in an embodiment may be combined with another embodiment. In addition, configurations disclosed in the respective multiple embodiments may be collected and combined.

The problems described in the present disclosure are not known, and are independently found out by the inventors, and thus the problems together with the configurations and methods of the present disclosure is a fact for affirming the inventive step of the present disclosure.

1. MUTUAL RELATION OF RELATED DEVICES IN EMBODIMENTS

An overall configuration illustrating devices used in the embodiments and a mutual relation therebetween will be described first with reference to FIG. 1.

An in-vehicle device 1 "mounted" on a vehicle which is a "moving object" corresponds to a radio wave map acquisition usage device 150 of a first embodiment, and transmits various data to an information storage server device 3 via a base station device 4.

In addition, the in-vehicle device 1 corresponds to a probe information transmission device 100, and transmits probe information to a radio wave map server device 5.

The term "moving object" refers to a movable object, and has a travel speed of any value. In addition, a case in which the moving object is stopped is also included. Examples of the moving object include, but are not limited to, an automobile, a motorcycle, a bicycle, a pedestrian, a ship, an aircraft, and an object mounted thereon.

The term "mounted" includes not only a case in which an object is directly fixed to the moving object but also a case in which an object is moved together with the moving object although the object is not fixed to the moving object. Examples of the in-vehicle device include one carried by a person in the moving object, and one mounted on a load placed in the moving object.

An information distribution server device 2 corresponds to a radio wave map acquisition usage device 160 of a second embodiment, and transmits various data to the in-vehicle device 1 via the base station device 4.

The base station device 4 (corresponding to an "external communication device") is a device that performs wireless communication with the in-vehicle device 1. In the embodiments, it is defined that there are multiple base station devices 4, and when these base station devices 4 are distinguished from each other, these base station devices 4 are described as a base station device 4A and a base station device 4B.

The radio wave map server device 5 corresponds to a radio wave map provision device 250 of the first embodiment and the second embodiment, and transmits a radio wave map to the in-vehicle device 1 or the information distribution server device 2.

In addition, the radio wave map server device 5 corresponds to a radio wave map generation device 200, and receives the probe information from the in-vehicle device 1 to generate a radio wave map.

As a wireless communication system between the base station device 4 and the in-vehicle device 1, for example, IEEE 802.11 (Wi-Fi (registered trademark)), IEEE 802.16 (WiMAX (registered trademark)), wideband code division multiple access (W-CDMA), high speed packet access (HSPA), long term evolution (LTE), long term evolution advanced (LTE-A), 4G, and 5G can be used. Alternatively, dedicated short range communication (DSRC) can be used.

A communication system between the information distribution server device 2 and the base station device 4 and a communication system between the information storage server device 3 and the base station device 4 may be a wired communication system, a wireless communication system, or both the wired communication system and the wireless communication system. For example, when the wireless communication system between the base station device 4 and the in-vehicle device 1 is 4G, the base station device 4 corresponds to an eNB, and thus a line from the eNB is usually a wired line of a communication service provider, and when the wireless communication system between the base station device 4 and the in-vehicle device 1 is Wi-Fi, the base station device 4 corresponds to an access point (AP), and thus the wireless communication system or the wired communication system may be used from the access point to a router.

The radio wave map server device 5 stores the "radio wave map" and transmits the radio wave map to a request destination. For example, the radio wave map server device 5 transmits the radio wave map to the in-vehicle device 1 or the information distribution server device 2 in response to a radio wave map request or periodically. A communication network used for transmitting the radio wave map may be the wired communication system or the wireless communication system. In addition, in FIG. 1, when the radio wave map server device 5 transmits the radio wave map to the in-vehicle device 1, a communication network that does not pass through the base station device 4 is used, and a communication network that passes through the base station device 4 may be used.

The term "radio wave map" refers to a collection of a state of a radio wave propagation path or estimation results at a specific position, and refers to, for example, a map in which an RSSI or a transmission bit rate is mapped to each grid point on a map. In an embodiment to be described later, a communication speed such as the transmission bit rate is used as an index indicating the state of the radio wave propagation path or the estimation results.

In FIG. 1, the radio wave map server device 5 stores and uses the state of the radio wave propagation path or the estimation results provided by the wireless communication system of the base station device 4. Since the radio wave propagation path includes an uplink and a downlink, the radio wave map server device 5 may store two radio wave maps.

In the downlink-radio wave map, information for evaluating a reception status of the downlink may be associated with position information. For example, a reception radio wave map is generated by measuring and collecting a reception strength when a probe vehicle receives a reference signal transmitted by the base station device 4. For example, an RSSI, RSRP, or RSRQ of the reference signal corresponds thereto. Alternatively, a transmission radio wave map is generated by collecting, together with the position information on the probe vehicle, a transmission average bit rate (bits/s) when the information distribution server device 2 transmits data.

In the uplink-radio wave map, information for evaluating a reception status of the uplink may be associated with the position information. For example, a reception radio wave map is generated by measuring a reception strength when the base station device 4 receives a reference signal transmitted by the probe vehicle and collecting the reception strength together with the position information on the probe vehicle. For example, an RSSI, RSRP, or RSRQ of the reference signal corresponds thereto. Alternatively, a transmission radio wave map is generated by collecting, together with the position information on the probe vehicle, a transmission average bit rate (bits/s) when the probe vehicle transmits data.

In principle, the uplink-radio wave map is used to evaluate the uplink radio wave propagation path, and the downlink-radio wave map is used to evaluate the downlink radio wave propagation path. When the in-vehicle device 1 uses the uplink to transmit data in the first embodiment, the uplink-radio wave map is used. In addition, when the information distribution server device 2 uses the downlink to transmit data in the second embodiment, the downlink-radio wave map is used.

However, when uplink and downlink propagation environments can be evaluated as the same, the downlink-radio wave map may be used to evaluate the uplink, or the uplink-radio wave map may be used to evaluate the downlink. For example, a TDD mode in which the uplink and downlink use the same frequency band may be provided. As another example, a change in the same propagation environments of the uplink and the downlink due to obstructions such as a building may be expected.

A GNSS satellite 6 is a satellite that transmits a positioning signal, and examples thereof include a GPS and a differential GPS. The in-vehicle device 1 receives the positioning signal and acquires current position information indicating a vehicle current position by using a gyroscope or a radar sensor together as necessary.

The information distribution server device 2, the information storage server device 3, and the radio wave map server device 5 are separate devices, but at least two functions of these devices may be implemented by the same server device.

In addition, it is defined that the information distribution server device 2 does not move in FIG. 1, but the information distribution server device 2 may be mounted on a vehicle other than the vehicle on which the in-vehicle device 1 is mounted, and may transmit data to the in-vehicle device 1 via the base station device 4. This case will be described in a third embodiment.

An example in which the in-vehicle device 1 has functions of both the radio wave map acquisition usage device 150 and the probe information transmission device 100 has been described, and the in-vehicle device 1 may have only one of the functions.

In addition, the radio wave map server device 5 has functions of both the radio wave map generation device 200 and the radio wave map provision device 250, and the functions may be provided separately by separate server devices.

2. FIRST EMBODIMENT (1) Configuration of In-Vehicle Device 1 (Probe Information Transmission Device 100 and Radio Wave Map Acquisition Usage Device 150)

A configuration of the in-vehicle device 1 of the present embodiment will be described with reference to FIG. 2. In the present embodiment, an example in which the in-vehicle device 1 implements the functions of both the probe information transmission device 100 and the radio wave map acquisition usage device 150 will be described.

The in-vehicle device 1 includes a position information acquisition unit 101, a wireless communication unit 102, a propagation environment information acquisition unit 103, a control unit 104, a transmission unit 105, a receiving unit 106, an application 107, and a storage unit 108.

The in-vehicle device 1 may include a general-purpose central processing unit (CPU), a volatile memory such as RAM, a non-volatile memory such as ROM, a flash memory, or a hard disk, various interfaces, and an internal bus connecting the elements to each other. By executing software on these hardware, a function of each functional block illustrated in FIG. 2 can be exhibited. The same applies to the radio wave map server device 5 illustrated in FIG. 4 to be described later.

Of course, the in-vehicle device may be implemented by dedicated hardware such as an LSI.

The in-vehicle device 1 is defined to have a form of an electric control unit (hereinafter abbreviated to ECU) as a semi-finished product in the present embodiment, but the present disclosure is not limited thereto. For example, a form of a component may be a semiconductor circuit or a semiconductor module, and a form of a finished product may be a personal computer (PC), a smartphone, a cellular phone, or a navigation system.

The in-vehicle device 1 may include a single ECU or multiple ECUs. For example, a communication ECU may perform communication with the outside. In addition, the probe information transmission device 100 and the radio wave map acquisition usage device 150 may include separate ECUs.

Figure 2:
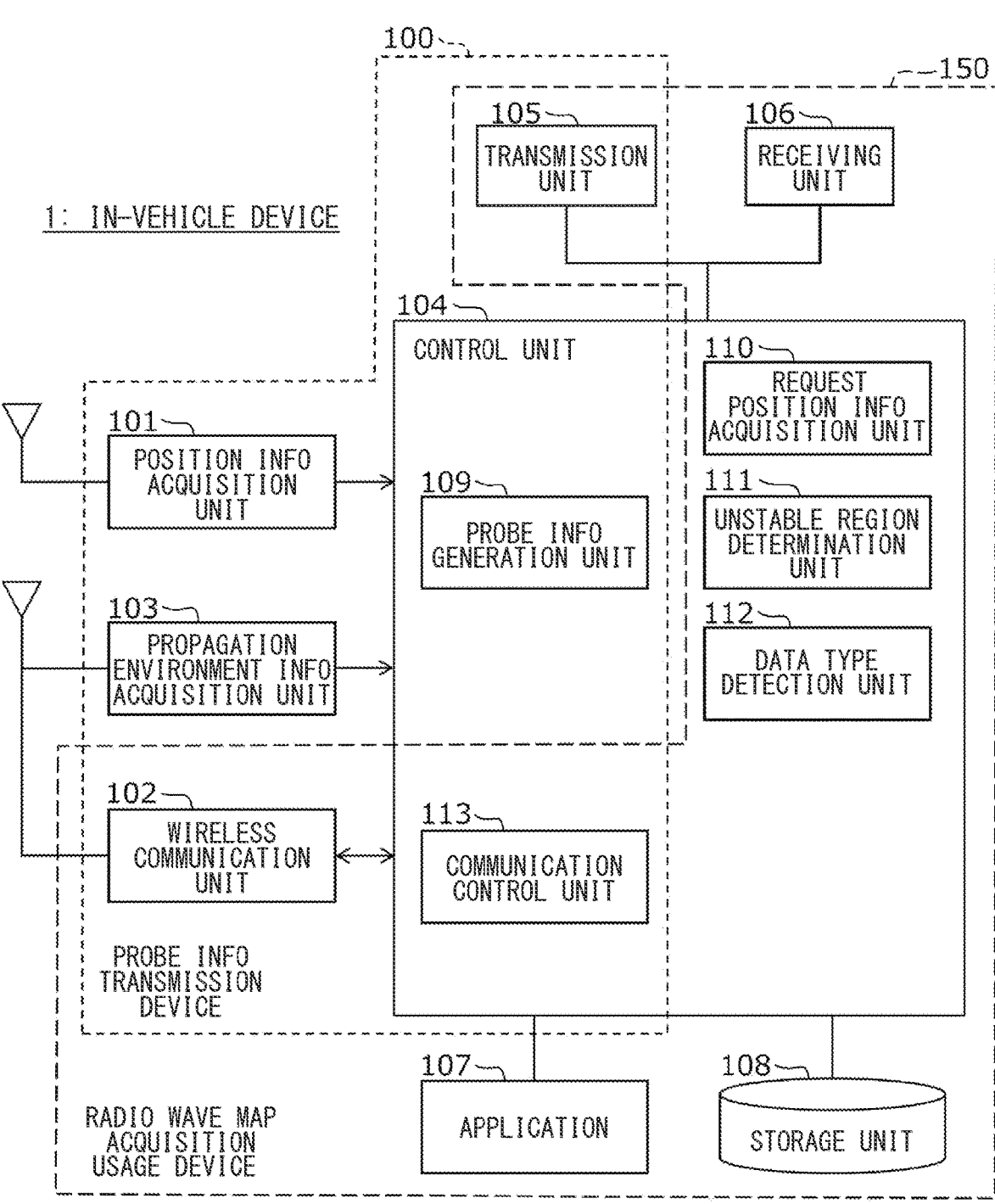
FIG. 2 is a block diagram illustrating a configuration example of a probe information transmission device and a radio wave map acquisition usage device which are in-vehicle devices according to a first embodiment of the present disclosure.

Blocks of the in-vehicle device 1 in FIG. 2 include a block exclusively used in the probe information transmission device 100, a block exclusively used in the radio wave map acquisition usage device 150, and a block used in both the probe information transmission device 100 and the radio wave map acquisition usage device 150. Hereinafter, the block used in the probe information transmission device 100 and the block used in the radio wave map acquisition usage device 150 will be described.

First, the block used in the probe information transmission device 100 will be described.

The position information acquisition unit 101 acquires position information indicating a vehicle current position. The position information acquisition unit 101 mainly includes a positioning receiver of a satellite positioning (GNSS) device. The positioning receiver may be a positioning receiver corresponding to a satellite system to be used.

The position information acquisition unit 101 includes the positioning receiver as well as a device that supplies correction information to be used for correcting the position information. For example, an inertial sensor such as a gyro sensor and an acceleration sensor, a laser sensor, and a map information database can also be grasped as the position information acquisition unit 101.

A positioning accuracy of the position information varies depending on a positioning system of the satellite system to be used, a type of data to be used for correction, and results of positioning calculation. For example, a single positioning system such as GPS always has an error of 1 m to 10 m. On the other hand, there are also positioning systems with an error class of less than 1 m or an error class of less than 10 cm, such as a relative positioning system, differential GPS (DGPS), real time kinematic (RTK)-GPS positioning, and network-type RTK-GPS positioning. The positioning system with an error class of less than 10 cm includes RTK-GNSS/

PPP-AR (quasi-zenith satellite MADOCA system) and PPP-RTK (quasi-zenith satellite CLAS system). The positioning accuracy can be raised to the class of less than 1 m or the class of less than 10 cm by using a gyroscope navigation system or the laser sensor together with the single positioning system. The positioning system with an error class of less than 1 m includes a sub-meter class positioning reinforcement service (SLAS) system using correction data. In addition, in the positioning calculation, when a FIX solution is obtained, the positioning accuracy class of less than 1 m or less than 10 cm may also be obtained when a positioning system with a low accuracy is used. When a FLOAT solution is obtained, the positioning accuracy class of less than 1 m may also be obtained when a positioning system with high accuracy is used. The FIX solution or the FLOAT solution is present in a positioning solution when using a method of performing ambiguity resolution (AR).

In the following description, regarding an error range, a class of less than 10 m is described as 1 m or more, a class of less than 1 m is described as 10 cm to 1 m, and a class of less than 10 cm is described as less than 10 cm.

The wireless communication unit 102 performs wireless communication with an external communication device, that is, the base station device 4 in the present embodiment, and transmits and receives necessary data. In the present embodiment, a base station device such as an eNB of a cellular communication system is defined as an external communication device, and when using Wi-Fi, the base station device may be an AP, and when using V2X, the base station device may be another vehicle or a roadside device. Of course, the base station device may correspond to multiple communication systems.

The propagation environment information acquisition unit 103 "acquires" "propagation environment information" on a radio wave propagation path to be used in the wireless communication of the wireless communication unit 102 at the vehicle current position acquired by the position information acquisition unit 101. For example, a device that measures a radio wave intensity of a reference signal can be used as the propagation environment information acquisition unit 103. Alternatively, a device that measures a bit rate of data transmitted from the wireless communication unit 102 can be used.

The term "propagation environment information" indicates a state of the radio wave propagation path or estimation results, and examples of indexes representing the state of the radio wave propagation path or the estimation results include RSSI, RSRP, RSRQ, SNR, SIR, BER, a propagation function, a propagation path matrix, and an average bit rate per unit time (bits/s).

In addition, the term "acquire" includes both a case in which the propagation environment information is acquired from the external communication device or the like and a case in which the propagation environment information is acquired by being generated by the probe information transmission device itself.

In order to acquire information for evaluating a reception quality of the downlink, the propagation environment information acquisition unit 103 may acquire information on a reception status in a frequency band allocated to the downlink. For example, the RSSI, the RSRP, and the RSRQ of the reference signal correspond thereto. By using such information, the radio wave map generation device 200 can generate or update a reception radio wave map at a specific position on a map.

In addition, in order to acquire information for evaluating a reception quality of the uplink, the propagation environment information acquisition unit 103 may acquire information on a transmission status in a frequency band allocated to the uplink. For example, a transmission average bit rate per unit time (bits/s) corresponds thereto. Alternatively, an RSSI, an RSRP, and an RSRQ of a reference signal measured in a base station may be received from the base station. By using such information, the radio wave map generation device 200 can generate or update a transmission radio wave map at a specific position on a map.

The propagation environment information acquisition unit 103 "acquires" external communication device identification information for identifying the base station device 4 in addition to the propagation environment information. The external communication device identification information is, for example, a base station ID assigned to each of the base station devices 4. The propagation environment information acquisition unit 103 acquires a base station ID included in a packet transmitted from the base station device 4 when the packet is decoded.

The term "acquire" includes both a case in which the external communication device identification information is acquired from the external communication device or the like and a case in which the external communication device identification information is acquired by being generated by the probe information transmission device itself.

The propagation environment information acquisition unit 103 may further acquire band information indicating the frequency band of the radio wave propagation path to be used in wireless communication. For example, when the wireless communication system is LTE, the band information is distinguished by assigning numbers such as Band 1 and Band 2 according to the frequency band and a duplex mode. The band information is also band information included in the packet transmitted from the base station when the packet is decoded.

Since characteristics of the radio wave propagation path change when the frequency band changes, the state of the radio wave propagation path can be more accurately represented by generating a radio wave map including the band information.

All or a part of the propagation environment information acquisition unit 103 described above may also serve as the wireless communication unit 102 as a function of the wireless communication unit 102.

In addition, the propagation environment information acquired and output by the propagation environment information acquisition unit 103 may be obtained by a normalized relative value instead of an absolute value of a measurement result of each value. For example, a maximum speed may be set to be 100 and a minimum speed may be set to be 0, and the maximum speed and the minimum speed can be extracted in an ideal communication status without radio wave interference.

The control unit 104 controls operations of the position information acquisition unit 101, the wireless communication unit 102, the propagation environment information acquisition unit 103, the transmission unit 105, the receiving unit 106, the application 107, and the storage unit 108. In addition, the control unit 104 itself implements a probe information generation unit 109, a request position information acquisition unit 110, an unstable region determination unit 111, a data type detection unit 112, and a communication control unit 113.

The probe information generation unit 109 generates probe information including position information acquired by the position information acquisition unit 101, and the propagation environment information and the external communication device identification information acquired by the propagation environment information acquisition unit 103. When the propagation environment information acquisition unit 103 acquires the band information, the band information may also be included in the probe information.

The transmission unit 105 transmits the probe information generated by the probe information generation unit 109 to the radio wave map generation device 200.

For example, in the present embodiment, the following information is transmitted as the probe information.
(Probe Information)
(Example of Downlink-Radio Wave Map)

Time stamp: a time when the probe information is generated (UTC)

Position information: any one of coordinates positioned by a GNSS, an ID representing a grid point on a map, and latitude, longitude, and altitude (WGS-84)

Positioning accuracy information: a grade of positioning accuracy (1 m or more/10 cm to 1 m/less than 10 cm)

Communication system ID: a base station ID, band information

Propagation environment information: a relative value of a received radio wave intensity (RSSI)
(Example of Uplink-Radio Wave Map)

Time stamp: a time when the probe information is generated (UTC)

Position information: any one of coordinates positioned by a GNSS, an ID representing a grid point on a map, and latitude, longitude, and altitude (WGS-84)

Positioning accuracy information: a grade of positioning accuracy (1 m or more/10 cm to 1 m/less than 10 cm)

Communication system ID: a base station ID, band information

Propagation environment information: a transmission bit rate (bits/s)

Other information may be transmitted as the probe information.

In addition, the information to be transmitted as the probe information may be generated by a specific block other than the control unit 104.

As described above, according to the probe information transmission device 100 of the present embodiment, the external communication device identification information for identifying the external communication device is transmitted, and thus the radio wave map in which the external communication device is specified can be generated on a side of the radio wave map generation device 200 which receives the external communication device identification information.

Next, the block used in the radio wave map acquisition usage device 150 will be described.

The request position information acquisition unit 110 specifies a physical position using wireless communication in the radio wave map acquisition usage device 150 as the in-vehicle device 1, determines the physical position as a request position, and "acquires" "request position information". The request position may be, for example, a current position or a position at which future traveling is scheduled based on a travel plan. When the travel plan is used, a single or multiple points at which a vehicle arrives within a certain period of time based on a current vehicle speed may be set as request positions. In the case of the multiple points, for example, a position at a certain period of time or at a certain distance may be selected.

In the present embodiment, the request position information acquisition unit 110 itself generates the request position information using the travel plan to acquire the same, and the request position information may be acquired by being received from another device. An example of acquiring the position information from the inside of the in-vehicle device 1 includes acquiring the position information by receiving the same from the position information acquisition unit 101. An example of acquiring the position information from the outside of the in-vehicle device 1 includes acquiring the position information by receiving the same via the wireless communication unit 102 from an external server device that manages the travel plan.

The "request position information" may be information for specifying a request position, and the position may be indicated by points or a collection of points, and may be indicated by a line, a surface, or a solid obtained by adding an altitude to the surface. In addition, the position may be a future position in addition to the current position. Further, in addition to information directly indicating the position, information indirectly indicating the position such as a speed or a time may be used.

In addition, the term "acquire" includes not only acquiring the request position information by receiving the same from another device but also acquiring the request position information by generating the same by the host device.

The transmission unit 105 transmits, to the radio wave map provision device 250, a radio wave map request including the request position information generated and acquired by the request position information acquisition unit 110.

For example, in the present embodiment, the following information is transmitted as the radio wave map request. In the present embodiment, an uplink-radio wave map is requested for the purpose of transmission control when data is transmitted from the in-vehicle device 1 to the information storage server device 3.

(Radio Wave Map Request)

Requested position information: latitude, longitude, and altitude (WGS-84), and an ID representing a grid point on a map The radio wave map provision device 250 that receives the radio wave map request selects information on the radio wave map to be transmitted based on the request position information included in the radio wave map request, and transmits the selected information to the radio wave map acquisition usage device 150 as a radio wave map reply. The details of the operation of the radio wave map provision device 250 will be described later.

The receiving unit 106 receives the radio wave map reply from the radio wave map provision device 250. Specifically, the radio wave map reply including reference position information indicating a reference position corresponding to "request position information", a connection probability, which is a probability of performing wireless communication with each of the base station devices 4 (corresponding to "each of multiple external communication devices") at the reference position, a lowest guaranteed speed at the reference position obtained based on the connection probability and the communication speed with each of the base station devices 4 at the reference position, and an estimated speed at the reference position obtained based on the communication speed and the connection probability is received.

The details of the communication speed and the connection probability will be described in a configuration and the operation of the radio wave map provision device 250.

The received reference position information and connection probability are a part of the radio wave map selected by the radio wave map provision device 250, and thus may also be referred to as a radio wave map.

For example, in the present embodiment, the following information is received as the radio wave map reply.

The term "corresponding to the request position information" indicates being the same position as or near the position indicated by the request position information.

(Radio Wave Map Reply)

Time stamp: a time when a radio wave map is generated (UTC)

Reference position information: latitude, longitude, and altitude (WGS-84) and an ID representing a grid point on a map Expected connection base station: a base station ID of a base station device having a possibility of connection at a reference position and a connection probability for each base station ID Lowest guaranteed speed: a lowest guaranteed speed (bits/s)

Estimated speed: an estimated speed (bits/s)

The storage unit 108 stores the received radio wave map reply. Since a collection of the reference position information, the base station ID, the connection probability, the lowest guaranteed speed, and the estimated speed stored in the storage unit 108 is a part of the radio wave map stored in the radio wave map provision device 250, it can be said that a replica of the radio wave map is stored in the storage unit 108. When the replica of the radio wave map is stored in the storage unit 108 for a certain period of time, an opportunity to access the radio wave map provision device 250 can be reduced by the radio wave map request. In addition, a validity period of time may be set, and information whose validity period of time elapses may be discarded. Accordingly, a freshness of the replica of the radio wave map can be maintained at a certain level or more.

The unstable region determination unit 111 determines whether the reference position is in an unstable region based on the connection probability received by the receiving unit 106.

A method of determining an unstable region will be described with reference to FIG. 3.

Figure 3:
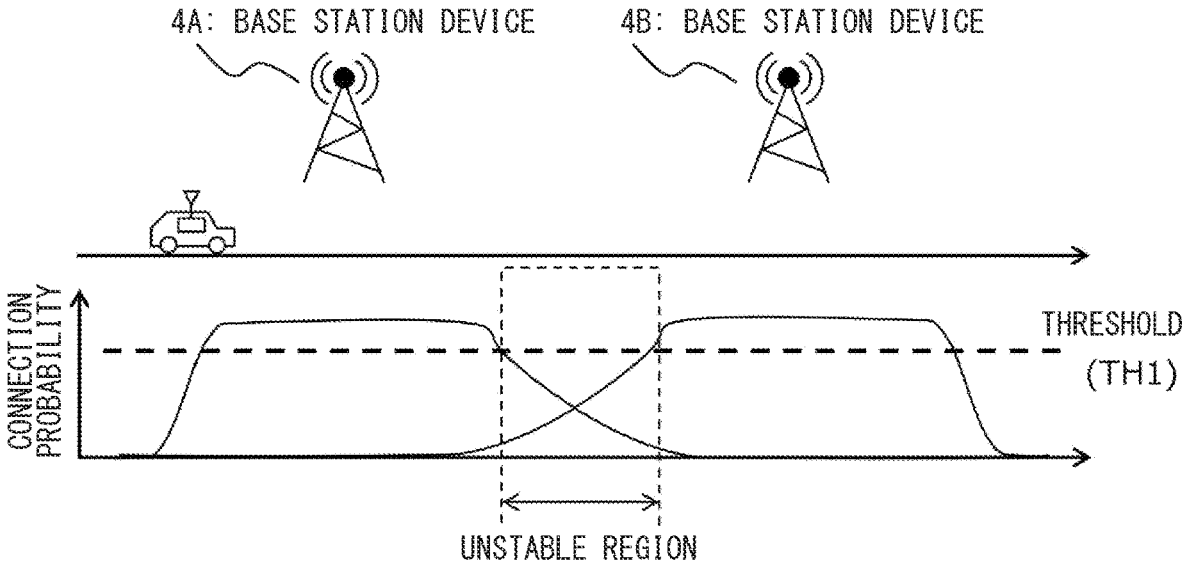
FIG. 3 is a diagram illustrating a determination method of an unstable region determination unit of the present disclosure.

FIG. 3 is a diagram illustrating a connection probability that the in-vehicle device 1 connects to the base station device 4A and the base station device 4B. In the beginning, when the vehicle on which the in-vehicle device 1 is mounted is traveling in a direction in which the base station device 4A is provided, the connection probability with the base station device 4A is almost 100%. However, as the vehicle passes near the base station device 4A and moves away from the base station device 4A, the connection probability with the base station device 4A decreases, and the connection probability with the base station device 4B in a traveling direction increases. Then, the connection probability with the base station device 4A is zero, and the connection probability with the base station device 4B is 100%.

In a region in which the vehicle can connect both the base station device 4A and the base station device 4B, a switching processing of connection between the base station device 4A and the base station device 4B occurs, and thus the connection is unstable. A region in which such connection is unstable is defined as an unstable region. For example, a region in which a maximum value of the connection probability with each of the base station device 4A and the base station device 4B, that is, the larger connection probability in this example, is TH1 "or less" is determined as an unstable region. The TH1 is a "predetermined threshold". For example, TH1 can be approximately 0.8.

Alternatively, for example, a region in which a difference between the connection probability with the base station device 4A and the connection probability with the base station device 4B is TH2, which is a predetermined threshold, or less may be defined as an unstable region. For example, TH2 can be approximately 0.6.

In addition, data other than the connection probability may be used in combination to determine the unstable region.

In addition, the same calculation may be performed when there are three or more base station devices 4.

The "predetermined threshold" may be a fixed value or a value determined by specifying conditions.

In addition, "or less" includes not only a case in which the predetermined threshold is included but also a case in which the predetermined threshold is not included.

The application 107 is an application that uses the wireless communication unit 102. Examples thereof include a program for transmitting image data of an on-board camera to use a vehicle remote monitoring system, and a program for receiving map data used in a navigation system or update data of an application.

The data type detection unit 112 detects a data type which is a feature of the data transmitted by the wireless communication unit 102. The data transmitted by the wireless communication unit 102 is data handled by the application 107, and for example, when the application 107 is a program in a terminal of the vehicle remote monitoring system, the data is the image data of the on-board camera.

The data type detection unit 112 detects, for example, the following data types.

When the data transmitted by the wireless communication unit 102 is data having an urgency of information transmission, the data type detection unit 112 detects that the data type is urgent data. The urgent data is data that needs to be transmitted with priority over other communication. Examples of the urgent data include emergency vehicle data, which is data transmitted by an emergency vehicle such as an ambulance, and collision avoidance notification data to be transmitted by a roadside device at intersections to avoid collisions.

When the data transmitted by the wireless communication unit 102 is data that allows communication delay, the data type detection unit 112 detects that the data type is communication delay allowance data. The communication delay allowance data is data with a long request for communication delay, ranging from several seconds to one day or longer. Examples of the communication delay allowance data include the map data used in the navigation system or the update data of the application.

When the data transmitted by the wireless communication unit 102 is data that needs to be transmitted in real time, the data type detection unit 112 detects that the data type is real-time data. The real-time data is data that has a real-time property and hardly allows communication delay. Examples of the real-time data include the image data of the on-board camera and various stream data.

The data type detection unit 112 can detect the data type by reading a data type identifier included in the data, for example. For example, when the data type identifier is 2-bit information, 00 may be determined as urgent data, 01 may be determined as communication delay allowance data, 10 may be determined as real-time data, and 11 may be determined as other data in advance, and the data type identifier may be included in data when the data is generated.

Examples of other data type detection methods include the following methods.

The data type detection unit 112 can detect that the data type is the urgent data by reading a priority flag in an IP protocol.

When the data is transmitted to a specific server, the data type detection unit 112 can detect the data type from the purpose or application of the specific server. For example, when the data is transmitted to a server device of the vehicle remote monitoring system, it can be detected that the data type is the real-time data.

When the data has a specific extension, the data type detection unit 112 can detect the data type by specifying a type of the data. For example, when the extension indicates an update program used for a specific OS, it can be detected that the data type is the communication delay allowance data.

The communication control unit 113 controls wireless communication with each of the base station devices 4 based on a determination result of the unstable region determination unit 111. For example, communication in the unstable region is stopped, or communication is performed by lowering a bit rate in the unstable region.

In the present embodiment, the wireless communication with the base station device 4 is controlled based on the data type detected by the data type detection unit 112 in addition to the determination result of the unstable region determination unit 111. That is, in the unstable region, the wireless communication with the base station device 4 is controlled based on the data type.

For example, when the data type detected by the data type detection unit 112 is the communication delay allowance data, the communication control unit 113 instructs the wireless communication unit 102 to stop transmitting the communication delay allowance data. Under the control, it is possible to shorten time required for communication by performing wireless communication only in a place in which a communication environment is good.

When the data type detected by the data type detection unit 112 is the real-time data, the communication control unit 113 instructs the wireless communication unit 102 to transmit the real-time data based on the lowest guaranteed speed included in the radio wave map reply. For example, a compression rate, a degree of resolution, or a modulation system at which no real-time property is impaired is used even when the real-time data is transmitted at a transmission rate lowered to the lowest guaranteed speed or at the lowest guaranteed speed. Under the control, the communication can be continued while maintaining the real-time property.

When the data type detected by the data type detection unit 112 is the urgent data, the communication control unit 113 instructs the wireless communication unit 102 to transmit the urgent data based on the estimated speed included in the radio wave map reply. Under the control, the urgent data can be transmitted with priority over other communication.

The wireless communication unit 102 transmits the data by performing wireless communication with the base station device 4 under the control of the communication control unit 113.

As described above, according to the radio wave map acquisition usage device 150 of the present embodiment, an influence on the communication in the unstable region can be minimized by controlling the wireless communication with the base station device 4 based on the determination result of the unstable region determination unit 111.

In addition, by controlling the wireless communication with the base station device 4 based on the data type of the data to be transmitted in addition to the determination result of the unstable region determination unit 111, the control of the wireless communication in the unstable region can be adaptively changed according to the data type.

(2) Configuration of Radio Wave Map Server Device 5 (Radio Wave Map Generation Device 200 and Radio Wave Map Provision Device 250)

A configuration of the radio wave map server device 5 of the present embodiment will be described with reference to FIG. 4. In the present embodiment, an example in which the radio wave map server device 5 implements both the functions of the radio wave map generation device 200 and the radio wave map provision device 250 will be described.

The radio wave map server device 5 includes a receiving unit 201, a probe information storage unit 202, a control unit 203, a radio wave map storage unit 204, and a transmission unit 205.

The radio wave map server device 5 is defined to have a form of a server device as a finished product in the present embodiment, but the present disclosure is not limited thereto. For example, a form of a component includes a semiconductor circuit and a semiconductor module, a form of a semi-finished product includes an ECU, and a form of a finished product includes a personal computer (PC), a workstation, a smartphone, and a cellular phone.

The radio wave map server device 5 may be mounted on the moving object. When the radio wave map server device 5 is mounted on the moving object, the radio wave map server device 5 is implemented in vehicle-to-vehicle communication in which vehicles directly communicate with each other or vehicle-to-vehicle communication in which vehicles indirectly communicate with each other via a base station device or the like.

Figure 4:
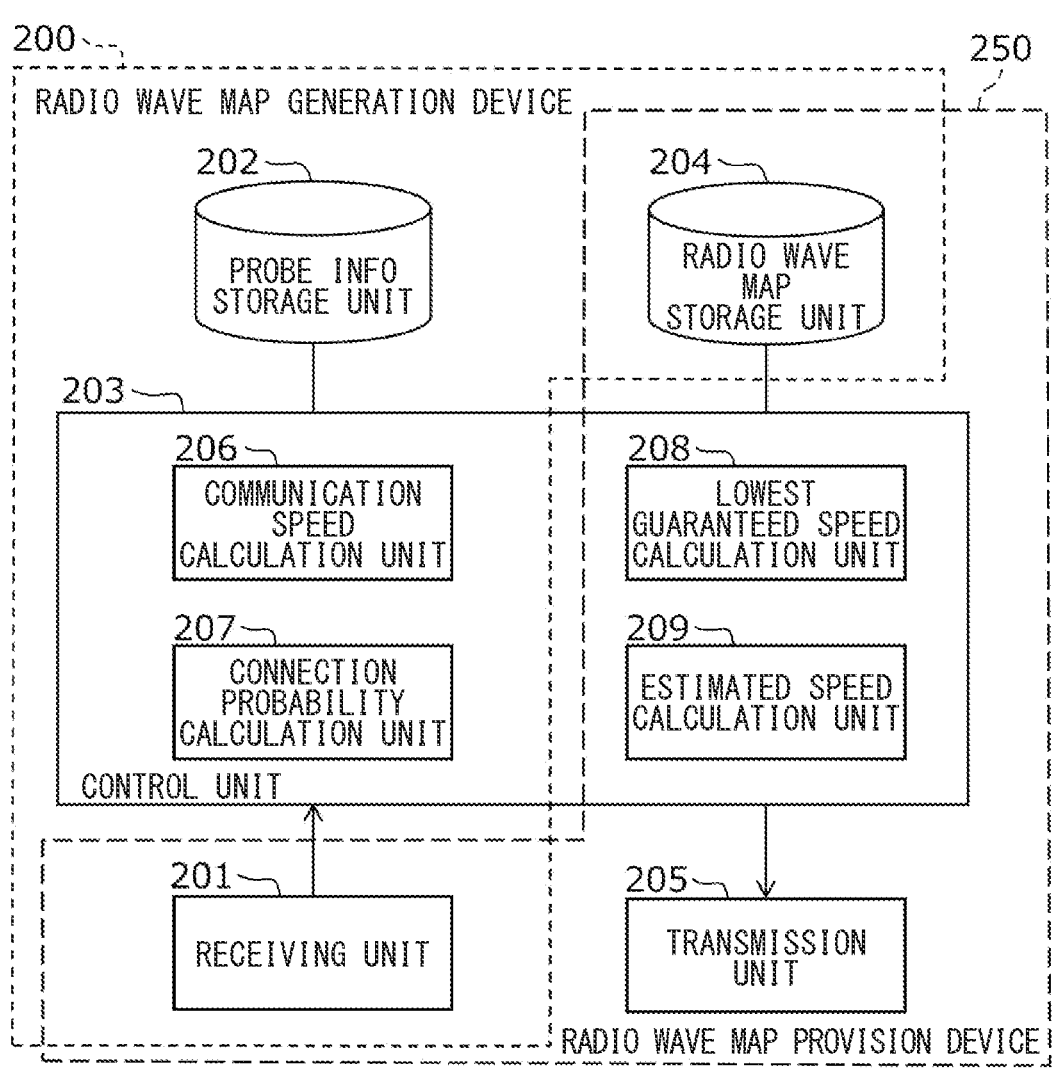
FIG. 4 is a block diagram illustrating a configuration example of a radio wave map generation device and a radio wave map provision device which are radio wave map server devices according to the first embodiment of the present disclosure.

Blocks of the radio wave map server device 5 in FIG. 4 include a block exclusively used in the radio wave map generation device 200, a block exclusively used in the radio wave map provision device 250, and a block used in both the radio wave map generation device 200 and the radio wave map provision device 250. Hereinafter, the block used in the radio wave map generation device 200 and the block used in the radio wave map provision device 250 will be described.

Next, the block used in the radio wave map generation device 200 will be described.

The receiving unit 201 receives multiple pieces of probe information including position information indicating a position of a vehicle that is a moving object, propagation environment information on a radio wave propagation path used for wireless communication between the vehicle and the base station device 4 which is an external communication device at the position, and external communication device identification information for identifying the base station device 4. The multiple pieces of probe information may be received from the same vehicle, and may be received from a large number of vehicles. The probe information used in the present embodiment is the same as the example described in (1).

The probe information storage unit 202 stores the probe information received by the receiving unit 201. The probe information storage unit 202 holds all probe information received in the past unless the information is deleted.

The control unit 203 controls operations of the receiving unit 201, the probe information storage unit 202, the radio wave map storage unit 204, and the transmission unit 205. In addition, the control unit 203 itself implements a communication speed calculation unit 206, a connection probability calculation unit 207, a lowest guaranteed speed calculation unit 208, and an estimated speed calculation unit 209.

Functions of the communication speed calculation unit 206, the connection probability calculation unit 207, and the radio wave map storage unit 204 will be described based on the radio wave map generated in the present embodiment with reference to FIG. 5A. FIG. 5A is a diagram illustrating the radio wave map of the present embodiment stored in the radio wave map storage unit 204.

The communication speed calculation unit 206 reads the probe information stored in the probe information storage unit 202 and calculates a communication speed with the base station device 4 based on the propagation environment information on the radio wave propagation path. In the present embodiment, as illustrated in FIG. 5A, it is defined that the base station devices 4 to be connected even at the same position are different from each other. Therefore, in the present embodiment, communication speeds are calculated separately for the different base station devices 4 even at the same position. That is, when there is a base station A and a base station B at the same position as the base station devices 4 that perform wireless communication, the communication speed calculation unit 206 calculates a communication speed with the base station A based on the propagation environment information on the radio wave propagation path, and calculates a communication speed with the base station B based on the propagation environment information on the radio wave propagation path.

As a specific example of a method of calculating a communication speed, an example is mentioned in which a table showing a relation between a radio wave intensity (RSRP) as the propagation environment information and a communication speed as shown in FIG. 5B is prepared in advance, and a downlink communication speed and an uplink communication speed corresponding to a range to which the radio wave intensity (RSRP) of each probe information belongs are obtained.

RSRP is used as the radio wave intensity in this example, and SINR or RSSI, which is another propagation environment information, may be used.

In addition, instead of using the table, the communication speed may be obtained by a predetermined calculation.

When the propagation environment information on the radio wave propagation path included in the probe information is a transmission bit rate, a value of the transmission bit rate may be directly used as the communication speed.

When there are multiple pieces of probe information at the same position and the same base station, the communication speed is collected into one piece of information for a specific position and a specific base station by performing a statistical processing. A statistical processing method includes, but is not limited to, obtaining an average value, an intermediate value, or a variance. In FIG. 5A, when there are seven samples connected to the base station A at a position p, an average value of communication speeds of the seven samples is set as a communication speed (1.5 Mbps) with the base station A at the position p. In addition, when there are three samples connected to the base station B at the position p, an average value of communication speeds of the three samples is set as a communication speed (0.9 Mbps) with the base station B at the position p.

Alternatively, the statistical processing may be performed at a stage of the propagation environment information before obtaining the communication speed, and the communication speed may be obtained based on a statistical processing result.

The same position may not be completely the same but may be within a certain range around the reference position. In the present embodiment, probe information within a certain range centered on a grid point on a map predetermined based on map information and a positioning accuracy is set as the probe information at the same position. For example, when the positioning accuracy is 1 m or more, an interval between grid points is 10 m, and when the positioning accuracy is 10 cm to 1 m, an interval between the grid points is 1 m. In the present embodiment, the grid points are regarded as reference positions. That is, positions shown in FIG. 5A correspond to the reference positions.

The connection probability calculation unit 207 reads the probe information stored in the probe information storage unit 202 and obtains a connection probability, which is a probability of performing wireless communication with each of the base station devices 4 at a specific position. The connection probability calculation unit 207 also calculates the connection probability for each of the base station devices 4. That is, a probability of performing wireless communication with the base station A and a probability of performing wireless communication with the base station B at the same position are calculated.

For example, in FIG. 5A, when there are ten samples connected to the base station device 4 at the position p, and there are seven samples connected to the base station A and three samples connected to the base station B among the samples, a connection probability with the base station A is 0.7 and a connection probability with the base station B is 0.3.

The radio wave map storage unit 204 stores the probe information read from the probe information storage unit 202 and results calculated by the communication speed calculation unit 206 and the connection probability calculation unit 207 as a radio wave map. In an example of FIG. 5A, a position (corresponding to "reference position information"), a time period, a connection base station, a communication speed, and a connection probability with the base station are stored.

A statistical processing is performed by reading the probe information from the probe information storage unit 202, and the communication speed and a frequency of processing of calculating the connection probability can be appropriately determined. For example, when processing is performed every day, probe information received on the day may be read from the probe information storage unit 202 at a predetermined time of the day and processed to generate a radio wave map. If the radio wave map is updated in a certain long span such as every day, it is possible to prevent old and new radio wave maps across an update timing from being present together in the radio wave map acquisition usage device 150, which is a user of the radio wave map.

Of course, the processing may be performed each time the receiving unit 201 receives the probe information.

The radio wave map stored in the radio wave map storage unit 204 may be newly generated by deleting an existing radio wave map for each frequency of the processing, and processing may be performed including data of the existing radio wave map, and the radio wave map may be updated to generate a new radio wave map. That is, in the present embodiment, the term "generate" is used, and the term "generate" is a concept including updating.

In the present embodiment, the radio wave map is generated by specifying up to the base station device 4 as shown in FIG. 5A, and the radio wave map may be generated by further specifying the band information of the same base station. Accordingly, accurate information can be generated at a level of each band information.

In the above description, the case in which the base station devices 4 to be connected are two, i.e., the base station A and the base station B have been described, and the similar processing is also performed when it is possible to connect to three or more base stations at the same position as in a position r in FIG. 5A.

As described above, according to the radio wave map generation device 200 of the present embodiment, the radio wave map is generated by receiving the external communication device identification information for identifying the external communication device, and thus it is possible to generate the radio wave map with accurate information at a level of each base station device to be connected.

In addition, according to the radio wave map generation device 200 of the present embodiment, the communication speed and the connection probability are calculated, and thus a lowest guaranteed value or an estimation value of the communication speed at a specific point can be easily calculated.

Next, the block used in the radio wave map provision device 250 will be described.

The radio wave map storage unit 204 stores the radio wave map including the reference position, the communication speed, and the connection probability at a level of each of the base station devices 4 as described in the radio wave map generation device 200.

The receiving unit 201 receives the radio wave map request including the "request position information" indicating the request position from the radio wave map acquisition usage device 150. The radio wave map request used in the present embodiment is the same as the example described in (1).

The "request position information" may be information for specifying a request position, and the position may be indicated by points or a collection of points, and may be indicated by a line, a surface, or a solid obtained by adding an altitude to the surface. In addition, the position may be a future position in addition to the current position. Further, in addition to information directly indicating the position, information indirectly indicating the position such as a speed or a time may be used.

The lowest guaranteed speed calculation unit 208 and the estimated speed calculation unit 209 will be described with reference to FIG. 5A and FIG. 6. FIG. 6 is a diagram illustrating a radio wave map provided by the radio wave map provision device 250.

The lowest guaranteed speed calculation unit 208 obtains a lowest guaranteed speed at the reference position based on the communication speed and the connection probability at the reference position. For example, the lowest guaranteed speed calculation unit 208 determines that the connection probability is TH3, which is a "predetermined threshold", "or more", and a minimum value of the communication speed is a lowest guaranteed speed. For example, if TH3 is 0.2, at the position p in FIG. 5A, the minimum value of the communication speed is 0.9 Mbps and the connection probability is 0.3, which satisfies a condition that the connection probability is 0.2 or more. Therefore, the lowest guaranteed speed at the position p is 0.9 Mbps.

The "predetermined threshold" may be a fixed value or a value determined by specifying conditions.

In addition, "or more" includes not only a case in which the predetermined threshold is included but also a case in which the predetermined threshold is not included.

As another method of obtaining the lowest guaranteed speed, for example, the slowest communication speed among the communication speeds of the base station device 4 may be regarded as the lowest guaranteed speed without setting a predetermined threshold.

The lowest guaranteed speed has a meaning of the lowest guaranteed communication speed at a specific point. That is, when the lowest guaranteed speed is used, a communication plan can be made on the premise that a communication status is the worst.

The estimated speed calculation unit 209 obtains an estimated speed at the reference position based on the communication speed and the connection probability at the reference position. For example, the estimated speed calculation unit 209 uses the communication speed with the base station device 4 having the highest connection probability as the estimated speed. For example, in the case of the position p in FIG. 5A, the base station device 4 having the highest connection probability is the base station A having a connection probability of 0.7, and the communication speed with the base station A is 1.5 Mbps. Therefore, the estimated speed at the position p is 1.5 Mbps.

As another method of obtaining the estimated speed, for example, an expected value may be obtained and used as an estimated speed. For example, in the case of the position p in FIG. 5A, when the communication speed and the connection probability with the base station A and the communication speed and the connection probability with the base station B are used, the expected value is as follows.

$$1.5 \text{ Mbps} \times 0.7 + 0.9 \text{ Mbps} \times 0.3 = 1.3 \text{ Mbps}.$$

The estimated speed has a meaning of a normally defined communication speed at a specific point. That is, when the estimated speed is used, a communication plan can be made using a normally available communication speed.

In the radio wave map of FIG. 5A, when there is one base station to be connected as in a position o or a position q, even when the lowest guaranteed speed calculation unit 208 and the estimated speed calculation unit 209 perform calculations, values are the same as communication speeds at the positions o and q, and thus as the lowest guaranteed speed or the estimated speed, the communication speeds at the points may be output as they are.

In the radio wave map of FIG. 5A, when there are three or more base station devices 4 to be connected as in the position r, the calculation may be performed for all the base station devices 4.

As illustrated in FIG. 6, the transmission unit 205 transmits the radio wave map reply including the connection probability, the lowest guaranteed speed, and the estimated speed at the reference position "corresponding to the request position information". The radio wave map reply used in the present embodiment is the same as the example described in (1).

As described above, according to the radio wave map provision device 250 of the present embodiment, the lowest guaranteed speed and the estimated speed are transmitted based on the radio wave map request, and thus the wireless communication can be controlled in the radio wave map acquisition usage device 150 according to the data type.

In addition, according to the radio wave map provision device 250 of the present embodiment, the connection probability for each of the base station devices 4 at the reference position is transmitted, and thus an unstable region can be determined in the radio wave map acquisition usage device 150.

(3) Operations of Probe Information Transmission Device 100 and Radio Wave Map Generation Device 200 in Radio Wave Map Generation Process Both the probe information transmission device 100 and the radio wave map generation device 200 are involved in generating the radio wave map. Hereinafter, operations of the probe information transmission device 100 and the radio wave map generation device 200 in a radio wave map generation process of the present embodiment will be described with reference to a flowchart of FIG. 7.

The following operation not only shows a probe information transmission method executed by the probe information transmission device 100, but also shows a processing procedure of a probe information transmission program executable by the probe information transmission device 100. In addition, the following operation not only shows a radio wave map generation/update method executed by the radio wave map generation device 200, but also shows a processing procedure of a radio wave map generation/update program executable by the radio wave map generation device 200.

Figure 7:
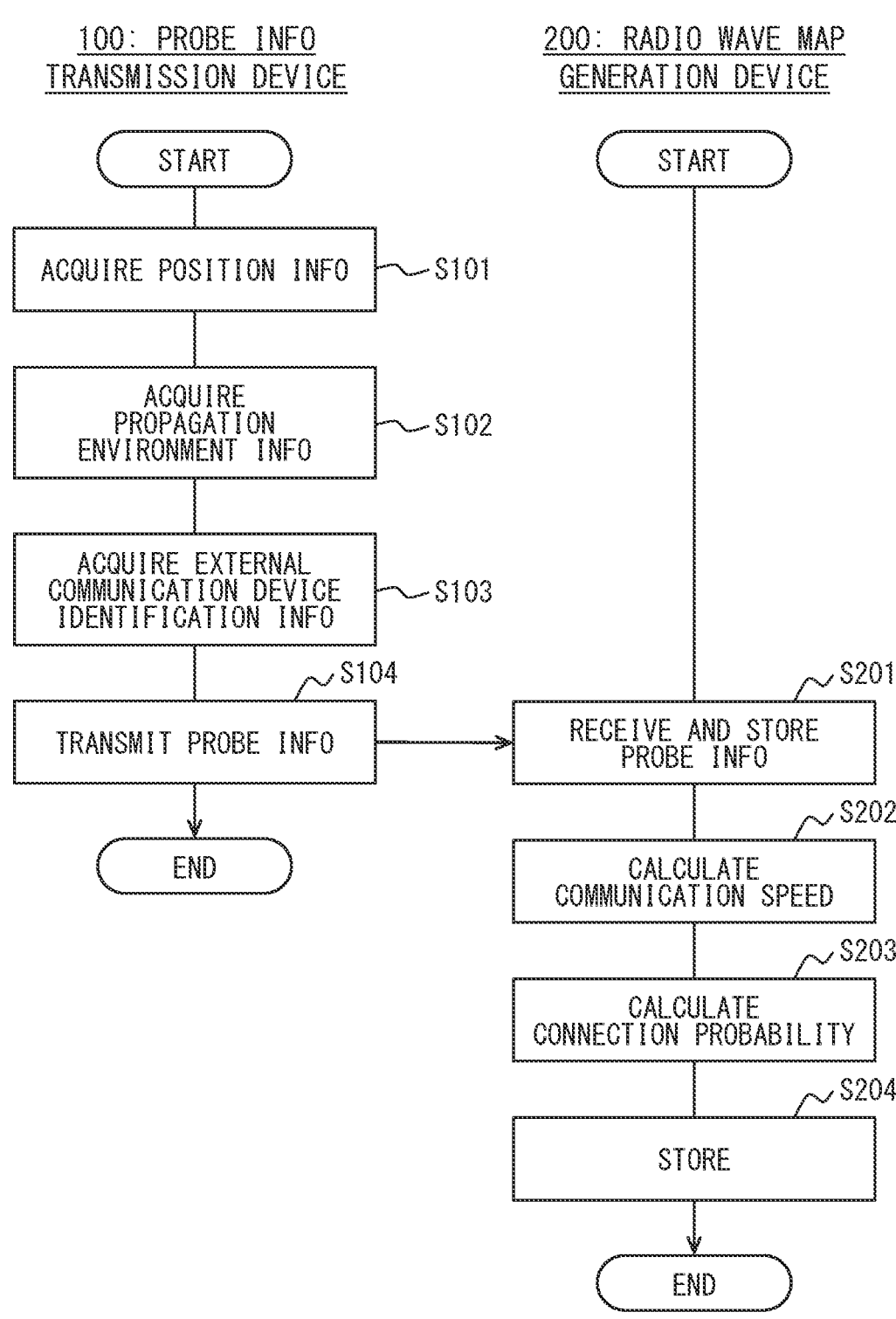
FIG. 7 is a flowchart illustrating operations of the probe information transmission device and the radio wave map generation device according to the first embodiment of the present disclosure.

The processing is not limited to an order illustrated in FIG. 7. That is, the order may be changed as long as there is no restriction such as a relation in which a result of the preceding step is used in a certain step.

The position information acquisition unit 101 of the probe information transmission device 100 acquires position information indicating a vehicle current position (S101).

The propagation environment information acquisition unit 103 acquires propagation environment information on a radio wave propagation path used in wireless communication with an external communication device at the current position (S102).

The propagation environment information acquisition unit 103 acquires external communication device identification information for identifying the external communication device (S103).

Then, the transmission unit 105 transmits, to the radio wave map generation device 200, the position information acquired in S101, the propagation environment information acquired in S102, and the external communication device identification information acquired in S103 as probe information (S104).

The receiving unit 201 of the radio wave map generation device 200 receives multiple pieces of probe information including the position information indicating a vehicle position, the propagation environment information on the radio wave propagation path used for wireless communication between the vehicle and the external communication device at the position indicated by the position information, and the external communication device identification information for identifying the external communication device, and stores the probe information in the probe information storage unit 202 (S201).

The communication speed calculation unit 206 obtains a communication speed at which the wireless communication is performed with each external communication device at the position indicated by the position information based on the multiple pieces of probe information (S202).

The connection probability calculation unit 207 obtains a connection probability, which is a probability of performing wireless communication with the external communication device at the position indicated by the position information (S203).

Then, the radio wave map storage unit 204 stores the position information and the external communication device identification information received in S201, the communication speed calculated in S202, and the connection probability calculated in S203 (S204).

(4) Operations of Radio Wave Map Provision Device 250 and Radio Wave Map Acquisition Usage Device 150 in Radio Wave Map Use Process Both the radio wave map provision device 250 and the radio wave map acquisition usage device 150 are involved in using the radio wave map. Hereinafter, operations of the radio wave map provision device 250 and the radio wave map acquisition usage device 150 in a radio wave map use process of the present embodiment will be described with reference to a flowchart of FIG. 8.

The following operation not only shows a radio wave map provision method executed by the radio wave map provision device 250, but also shows a processing procedure of a radio wave map provision program executable by the radio wave map provision device 250. In addition, the following operation not only shows a radio wave map acquisition usage method executed by the radio wave map acquisition usage device 150, but also shows a processing procedure of a radio wave map acquisition usage program executable by the radio wave map acquisition usage device 150.

Figure 8:
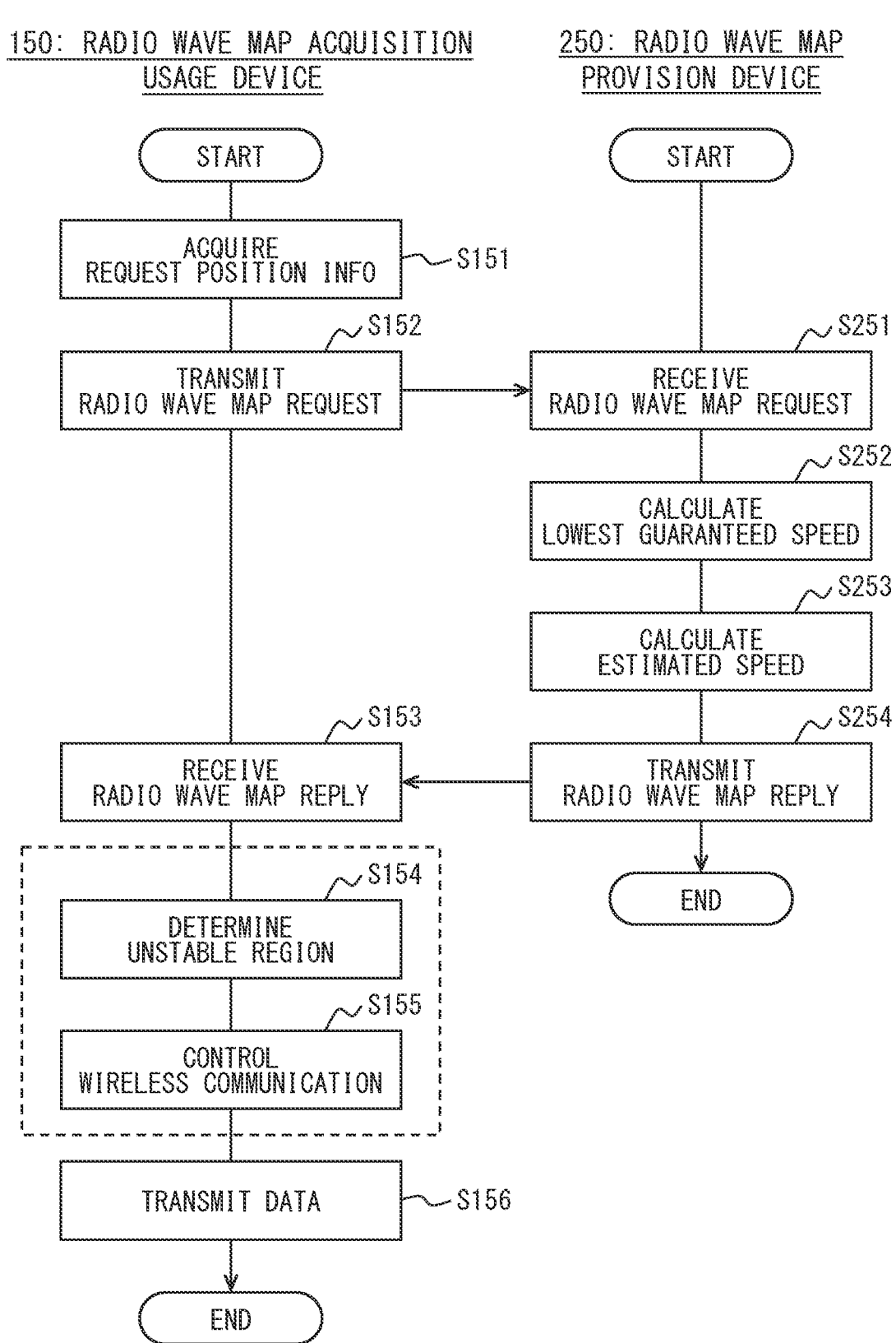
FIG. 8 is a flowchart illustrating operations of the radio wave map acquisition usage device and the radio wave map provision device according to the first embodiment of the present disclosure.

The processing is not limited to an order illustrated in FIG. 8. That is, the order may be changed as long as there is no restriction such as a relation in which a result of the preceding step is used in a certain step.

The request position information acquisition unit 110 of the radio wave map acquisition usage device 150 determines a request position and acquires request position information (S151).

The transmission unit 105 transmits a radio wave map request including the request position information generated in S151 to the radio wave map provision device 250 (S152).

The receiving unit 201 of the radio wave map provision device 250 receives the radio wave map request including the request position information indicating the request position (S251).

The lowest guaranteed speed calculation unit 208 obtains a lowest guaranteed speed at a reference position based on a communication speed and a connection probability at the reference position (S252).

The estimated speed calculation unit 209 obtains an estimated speed at the reference position based on the communication speed and the connection probability at the reference position (S253).

Then, the transmission unit 205 transmits a radio wave map reply including the connection probability at the reference position corresponding to the request position information, the lowest guaranteed speed obtained in S252, and/or the estimated speed obtained in S253 (S254).

The receiving unit 106 of the radio wave map acquisition usage device 150 receives the radio wave map reply from the radio wave map provision device 250 (S153).

The unstable region determination unit 111 determines whether the reference position is in an unstable region based on the connection probability received in S153 (S154).

The communication control unit 113 controls wireless communication with the base station device 4 based on a determination result in S154 (S155). The control contents of the wireless communication in S154 and S155 will be described as a subroutine with reference to FIG. 9.

Then, the wireless communication unit 102 transmits data by performing wireless communication with the base station device 4 (S156). For example, the application 107 is executed to transmit vehicle information collected by a vehicle to an external communication device.

Figure 9:
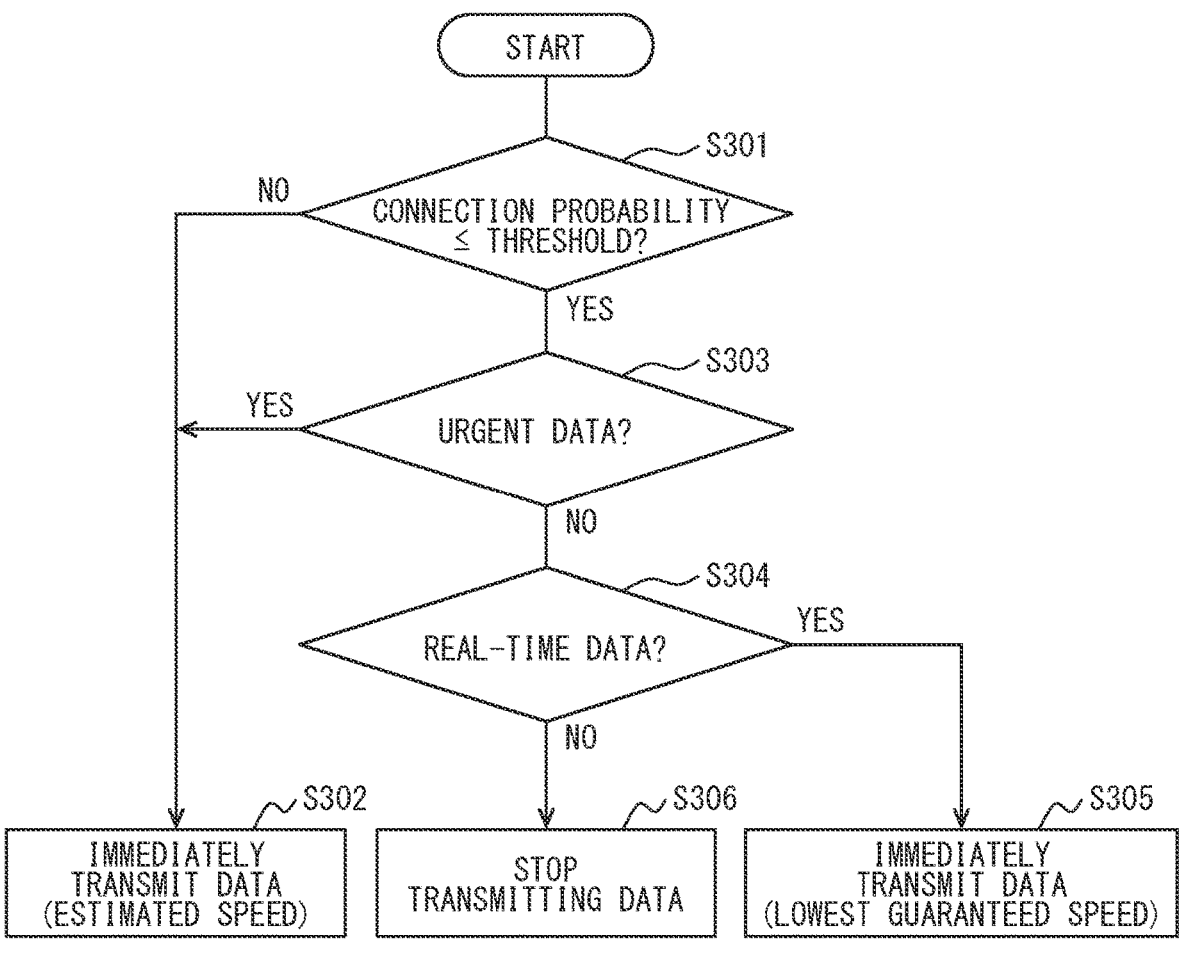
FIG. 9 is a flowchart illustrating a specific example of controlling wireless communication of the radio wave map acquisition usage device according to the first embodiment of the present disclosure.

A specific operation of controlling the wireless communication shown in S154 and S155 of FIG. 8 will be described with reference to FIG. 9.

The unstable region determination unit 111 determines whether the maximum value of the connection probability of the base station device to be connected at the reference position is a predetermined threshold or less (S301, S154). When the maximum value of the connection probability is the predetermined threshold or less (S301: Y), the processing proceeds to S303. When the maximum value of the connection probability is the predetermined threshold or more (S301: N), the processing proceeds to S302.

The communication control unit 113 determines that the reference position is a stable region, and instructs the wireless communication unit 102 to immediately transmit data to be transmitted based on the estimated speed included in the radio wave map reply (S302).

When a data type detected by the data type detection unit 112 is urgent data (S303: Y), the communication control unit 113 instructs the wireless communication unit 102 to immediately transmit the urgent data based on the estimated speed included in the radio wave map reply because an urgency is high although the reference position is in the unstable region (S302). When the data type detected by the data type detection unit 112 is not urgent data (S303: N), the processing proceeds to S304.

When the data type detected by the data type detection unit 112 is real-time data (S304: Y), the communication control unit 113 instructs the wireless communication unit 102 to immediately transmit the real-time data based on the lowest guaranteed speed included in the radio wave map reply (S305).

When the data type detected by the data type detection unit 112 is not the real-time data (S304: N), the communication control unit 113 instructs the wireless communication unit 102 to stop transmitting data (S306).

3. FIRST MODIFICATION OF FIRST EMBODIMENT

In the first embodiment, the lowest guaranteed speed and the estimated speed are obtained by the radio wave map server device 5 and transmitted to the in-vehicle device 1. The present modification is different from the first embodiment in that the lowest guaranteed speed and the estimated speed are obtained by the in-vehicle device 1.

Hereinafter, parts different from those of the first embodiment will be described, configurations similar to those of the first embodiment will be given the same reference numerals in the drawings, and the description of the first embodiment will be cited.

(1) Configuration of In-Vehicle Device (Probe Information Transmission Device 100 and Radio Wave Map Acquisition Usage Device 150)

Figure 10:
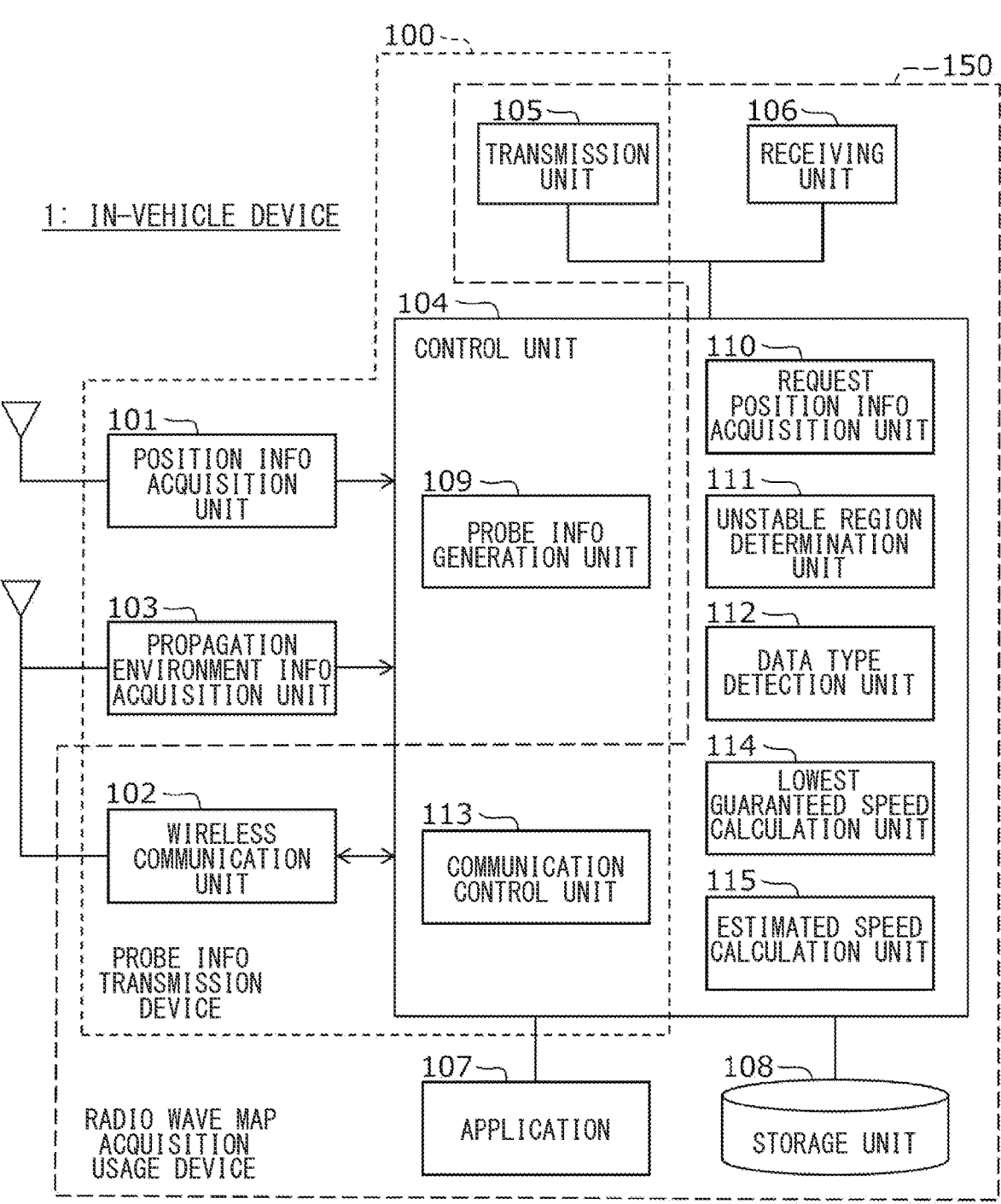
FIG. 10 is a block diagram illustrating a configuration example of a probe information transmission device and a radio wave map acquisition usage device which are in-vehicle devices according to a first modification of the first embodiment of the present disclosure.

A configuration of the in-vehicle device 1 of the present modification will be described with reference to FIG. 10. Since the present modification is different from the first embodiment only in the radio wave map acquisition usage device 150, a configuration of the radio wave map acquisition usage device 150 of the present modification will be described below.

The radio wave map acquisition usage device 150 of the present modification has a configuration in which a lowest guaranteed speed calculation unit 114 and an estimated speed calculation unit 115 are added to the radio wave map acquisition usage device 150 of the first embodiment.

The receiving unit 106 receives the radio wave map reply from the radio wave map provision device 250. Specifically, the radio wave map reply including reference position information indicating a reference position "corresponding to request position information", a communication speed with the base station device 4 at the reference position, and a connection probability, which is a probability of performing wireless communication with the base station device 4 at the reference position, is received. Unlike the first embodiment, no lowest guaranteed speed and estimated speed are included in the radio wave map reply.

The lowest guaranteed speed calculation unit 114 obtains a lowest guaranteed speed at the reference position based on the communication speed and the connection probability at the reference position. The lowest guaranteed speed calculation unit 114 has the same configuration and function as the lowest guaranteed speed calculation unit 208 in the radio wave map provision device 250 of the first embodiment.

The estimated speed calculation unit 115 obtains an estimated speed at the reference position based on the communication speed and the connection probability at the reference position. The estimated speed calculation unit 115 has the same configuration and function as the estimated speed calculation unit 209 in the radio wave map provision device 250 of the first embodiment.

As described above, according to the radio wave map acquisition usage device 150 of the present modification, the lowest guaranteed speed and the estimated speed are obtained by the in-vehicle device 1, and thus a load on the radio wave map server device 5 can be reduced.

(2) Configuration of Radio Wave Map Server Device (Radio Wave Map Generation Device 200 and Radio Wave Map Provision Device 250)

Figure 11:
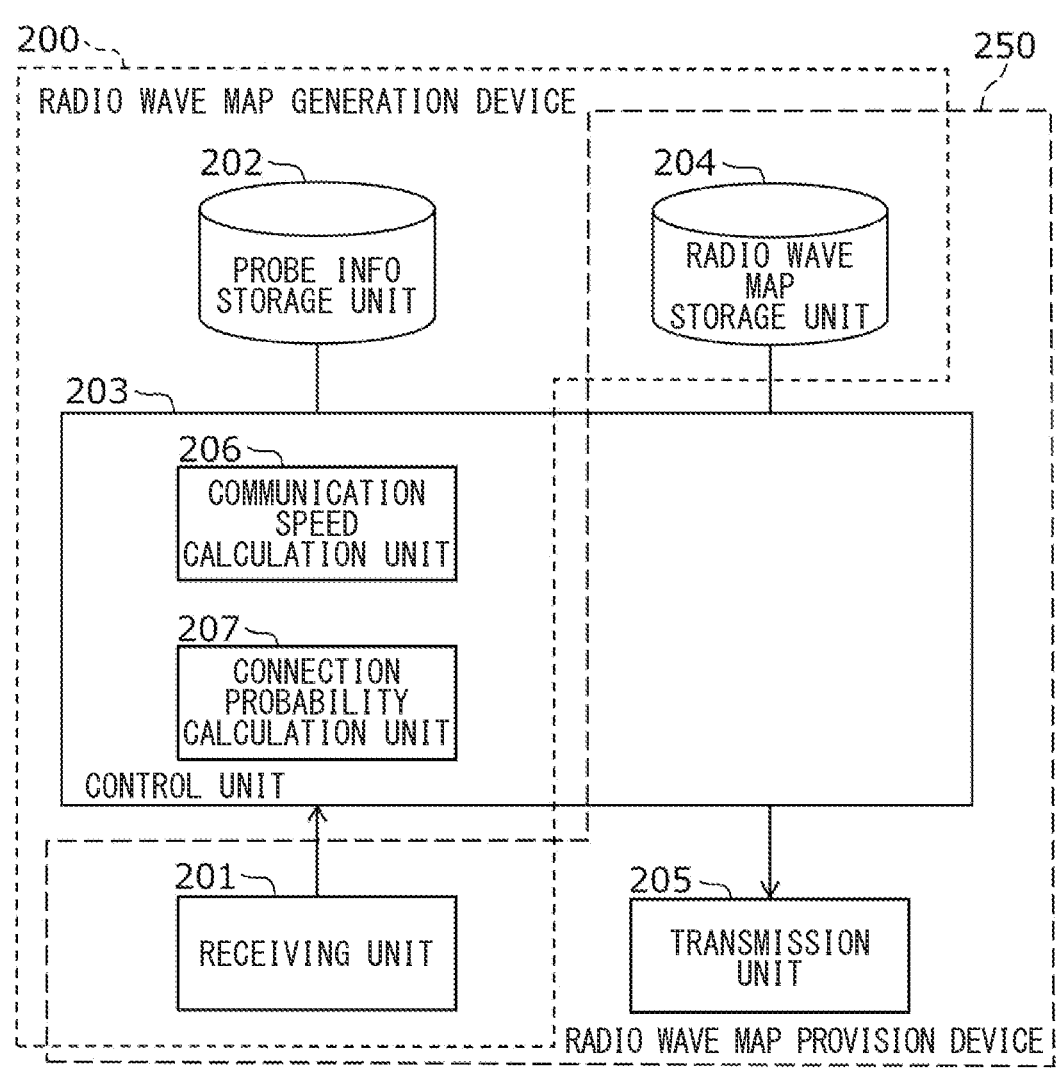
FIG. 11 is a block diagram illustrating a configuration example of a radio wave map generation device and a radio wave map provision device which are radio wave map server devices according to the first modification of the first embodiment of the present disclosure.

A configuration of the radio wave map server device 5 of the present modification will be described with reference to FIG. 11. Since the present modification is different from the first embodiment only in the radio wave map provision device 250, a configuration of the radio wave map provision device 250 of the present modification will be described below.

The radio wave map provision device 250 of the present modification has a configuration in which the lowest guaranteed speed calculation unit 208 and the estimated speed calculation unit 209 are removed from the radio wave map provision device 250 of the first embodiment.

The transmission unit 205 transmits the radio wave map reply including the communication speed and the connection probability at the reference position corresponding to the request position information.

(3) Others

In the radio wave map acquisition usage device 150 corresponding to the radio wave map provision device 250 in the present modification, the unstable region determination unit 111 is a necessary component. The lowest guaranteed speed calculation unit 114 and the estimated speed calculation unit 115 have any configurations.

As described above, according to the radio wave map provision device 250 of the present embodiment, the lowest guaranteed speed and the estimated speed are obtained by the in-vehicle device 1, and thus the load on the radio wave map server device 5 can be reduced.

4. SECOND MODIFICATION OF FIRST EMBODIMENT

In the first embodiment, the unstable region determination unit 111 is provided in the in-vehicle device 1. The present modification is different from the first embodiment in that an unstable region determination unit 210 is provided in the radio wave map server device 5 instead of the in-vehicle device 1.

Hereinafter, parts different from those of the first embodiment will be described, configurations similar to those of the first embodiment will be given the same reference numerals in the drawings, and the description of the first embodiment will be cited.

(1) Configuration of In-Vehicle Device (Probe Information Transmission Device 100 and Radio Wave Map Acquisition Usage Device 150)

Figure 12:
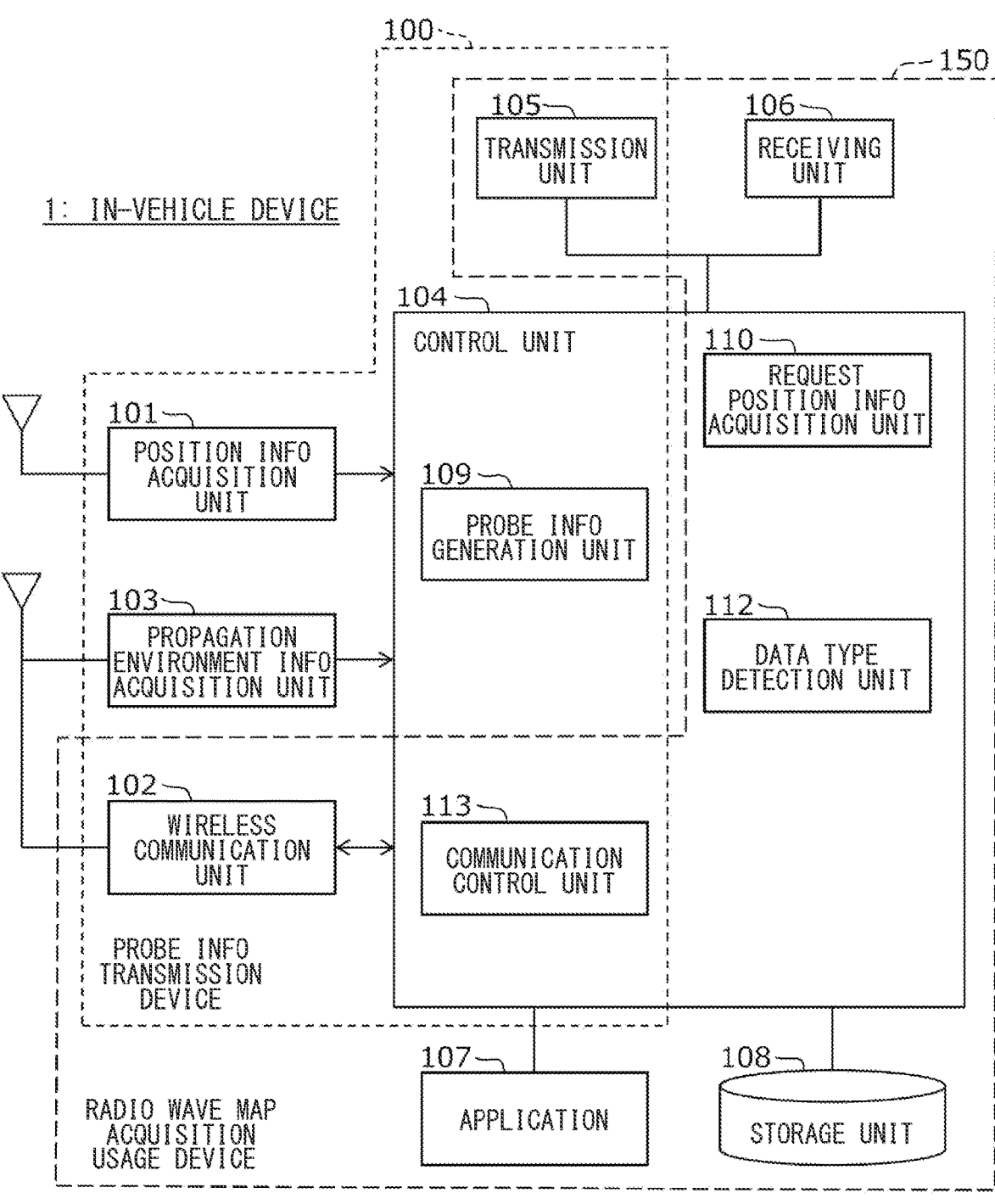
FIG. 12 is a block diagram illustrating a configuration example of a probe information transmission device and a radio wave map acquisition usage device which are in-vehicle devices according to a second modification of the first embodiment of the present disclosure.

A configuration of the in-vehicle device 1 of the present modification will be described with reference to FIG. 12. Since the present modification is different from the first embodiment only in the radio wave map acquisition usage device 150, a configuration of the radio wave map acquisition usage device 150 of the present modification will be described below.

The radio wave map acquisition usage device 150 of the present modification has a configuration in which the unstable region determination unit 111 is removed from the radio wave map acquisition usage device 150 of the first embodiment.

The receiving unit 106 receives the radio wave map reply from the radio wave map provision device 250. Specifically, the radio wave map reply including reference position information indicating a reference position "corresponding to request position information", a connection probability, which is a probability of performing wireless communication with the base station device 4 at the reference position, a lowest guaranteed speed at the reference position obtained based on the connection probability and a communication speed with the base station device 4 at the reference position, an estimated speed at the reference position obtained based on the communication speed and the connection probability, and information indicating whether the reference position obtained based on the connection probability is in an unstable region is received. That is, unlike the first embodiment, the information indicating whether the reference position is in the unstable region is added.

The communication control unit 113 controls wireless communication with each of the multiple base station devices 4 based on the information received by the receiving unit 106 and indicating whether the reference position is in the unstable region.

(2) Configuration of Radio Wave Map Server Device (Radio Wave Map Generation Device 200 and Radio Wave Map Provision Device 250)

Figure 13:
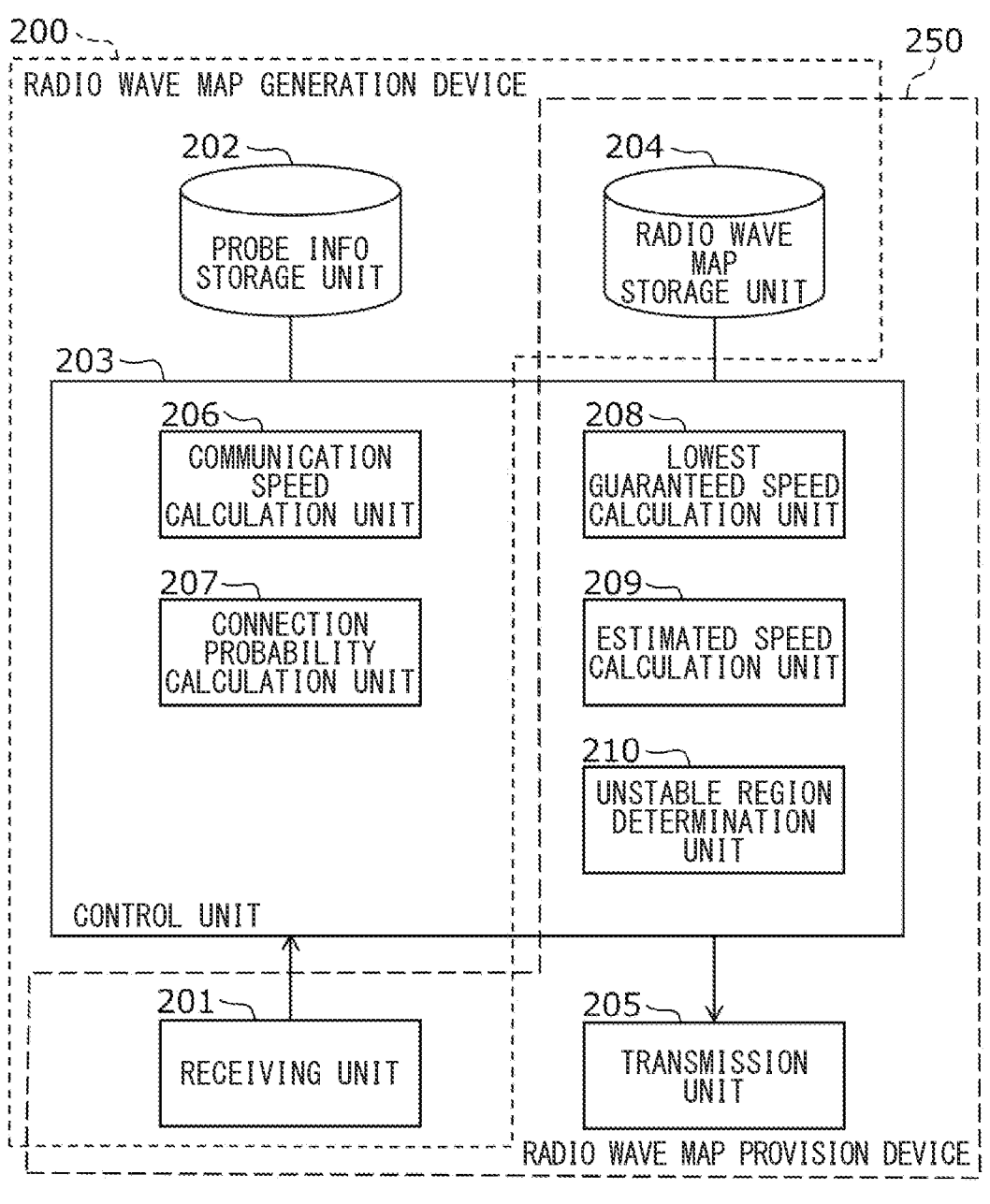
FIG. 13 is a block diagram illustrating a configuration example of a radio wave map generation device and a radio wave map provision device which are radio wave map server devices according to the second modification of the first embodiment of the present disclosure.

A configuration of the radio wave map server device 5 of the present modification will be described with reference to FIG. 13. Since the present modification is different from the first embodiment only in the radio wave map provision device 250, a configuration of the radio wave map provision device 250 of the present modification will be described below.

The radio wave map provision device 250 of the present modification has a configuration in which the unstable region determination unit 210 is added to the radio wave map provision device 250 of the first embodiment.

The unstable region determination unit 210 determines whether the reference position is in the unstable region based on the connection probability stored in the radio wave map storage unit 204. Then, the information indicating whether the reference position is in the unstable region is generated based on a determination result.

The transmission unit 205 transmits the radio wave map reply including the connection probability, the lowest guaranteed speed, the estimated speed at the reference position corresponding to the request position information, and the information indicating whether the reference position is in the unstable region.

5. THIRD MODIFICATION OF FIRST EMBODIMENT

In the first modification of the first embodiment, the unstable region determination unit 111 is provided in the in-vehicle device 1. The present modification is different from the first embodiment in that an unstable region determination unit 210 is provided in the radio wave map server device 5 instead of the in-vehicle device 1.

Hereinafter, parts different from those of the first modification of the first embodiment will be described, configurations similar to those of the first modification of the first embodiment will be given the same reference numerals in the drawings, and the description of the first embodiment will be cited.

(1) Configuration of In-Vehicle Device (Probe Information Transmission Device 100 and Radio Wave Map Acquisition Usage Device 150)

Figure 14:
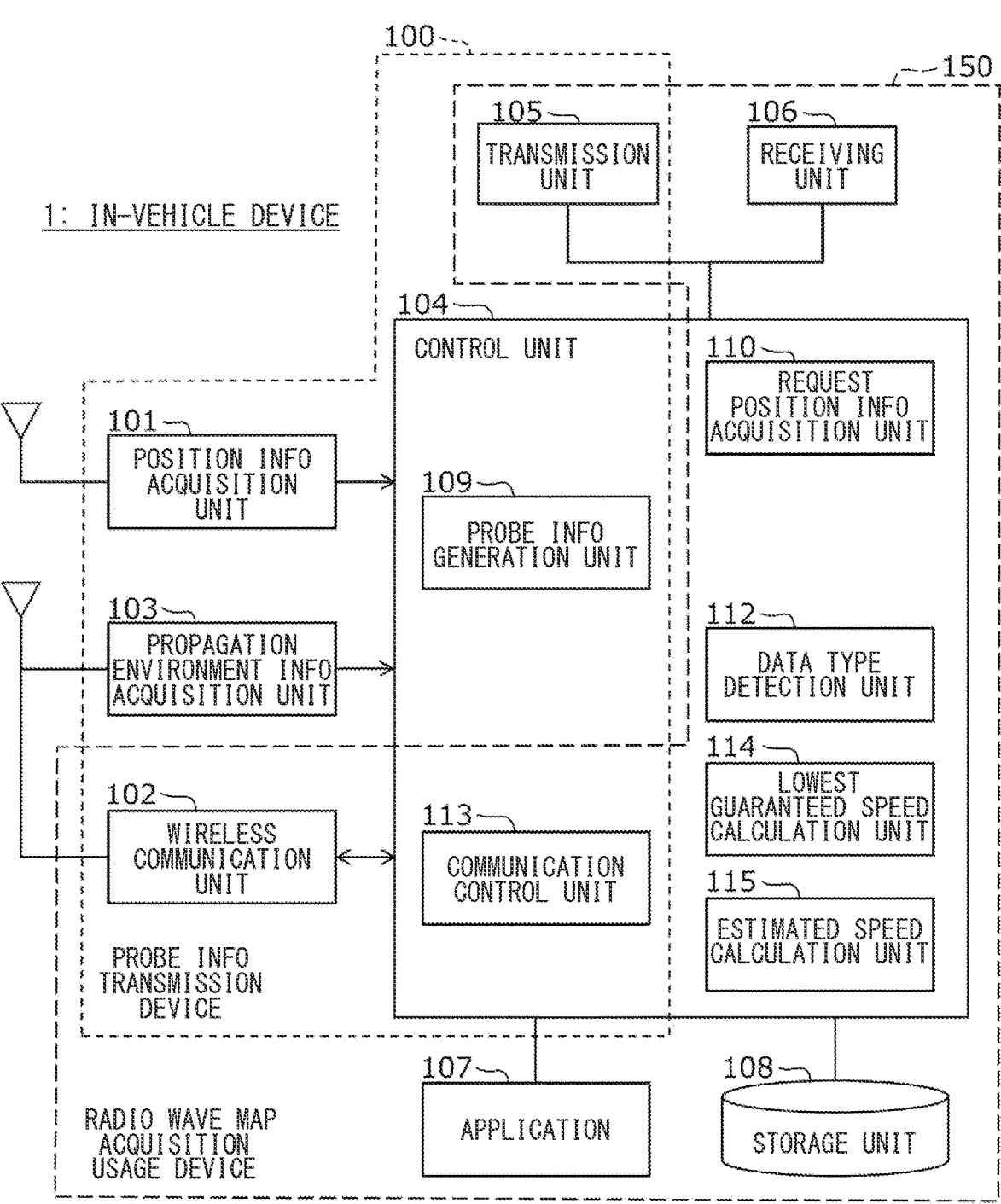
FIG. 14 is a block diagram illustrating a configuration example of a probe information transmission device and a radio wave map acquisition usage device which are in-vehicle devices according to a third modification of the first embodiment of the present disclosure.

A configuration of the in-vehicle device 1 of the present modification will be described with reference to FIG. 14. Since the present modification is different from the first modification of the first embodiment only in the radio wave map acquisition usage device 150, a configuration of the radio wave map acquisition usage device 150 of the present modification will be described below.

The radio wave map acquisition usage device 150 of the present modification has a configuration in which the unstable region determination unit 111 is removed from the radio wave map acquisition usage device 150 of the first modification of the first embodiment.

The receiving unit 106 receives the radio wave map reply from the radio wave map provision device 250. Specifically, the radio wave map reply including reference position information indicating a reference position corresponding to "request position information", a communication speed with the base station device 4 at the reference position, a connection probability, which is a probability of performing wireless communication with the base station device 4 at the reference position, and information indicating whether the reference position obtained based on the connection probability is in an unstable region is received. That is, unlike the first embodiment, the information indicating whether the reference position is in the unstable region is added.

The communication control unit 113 controls wireless communication with each of the multiple base station devices 4 based on the information received by the receiving unit 106 and indicating whether the reference position is in the unstable region.

(2) Configuration of Radio Wave Map Server Device (Radio Wave Map Generation Device 200 and Radio Wave Map Provision Device 250)

Figure 15:
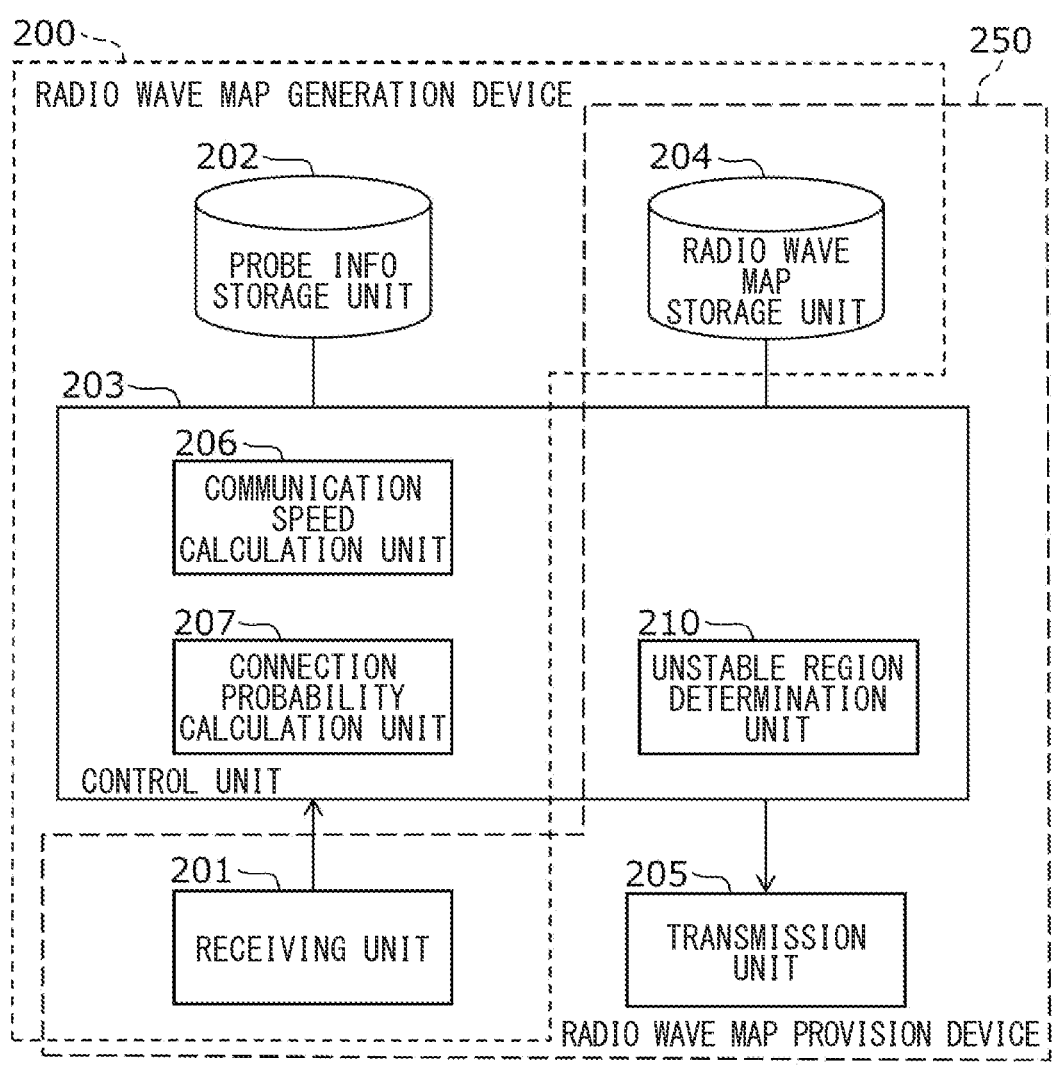
FIG. 15 is a block diagram illustrating a configuration example of a radio wave map generation device and a radio wave map provision device which are radio wave map server devices according to the third modification of the first embodiment of the present disclosure.

A configuration of the radio wave map server device 5 of the present modification will be described with reference to FIG. 15. Since the present modification is different from the first modification of the first embodiment only in the radio wave map provision device 250, a configuration of the radio wave map provision device 250 of the present modification will be described below.

The radio wave map provision device 250 of the present modification has a configuration in which the unstable region determination unit 210 is added to the radio wave map provision device 250 of the first modification of the first embodiment.

The unstable region determination unit 210 determines whether the reference position is in the unstable region based on the connection probability stored in the radio wave map storage unit 204. Then, the information indicating whether the reference position is in the unstable region is generated based on a determination result.

The transmission unit 205 transmits the radio wave map reply including the communication speed and the connection probability at the reference position corresponding to the request position information, and the information indicating whether the reference position is in the unstable region.

6. SECOND EMBODIMENT

In the first embodiment, the radio wave map acquisition usage device 150 is the in-vehicle device 1 mounted on a vehicle that is a moving object. In the present embodiment, a case in which the radio wave map acquisition usage device 160 is the information distribution server device 2 will be described.

Figure 16:
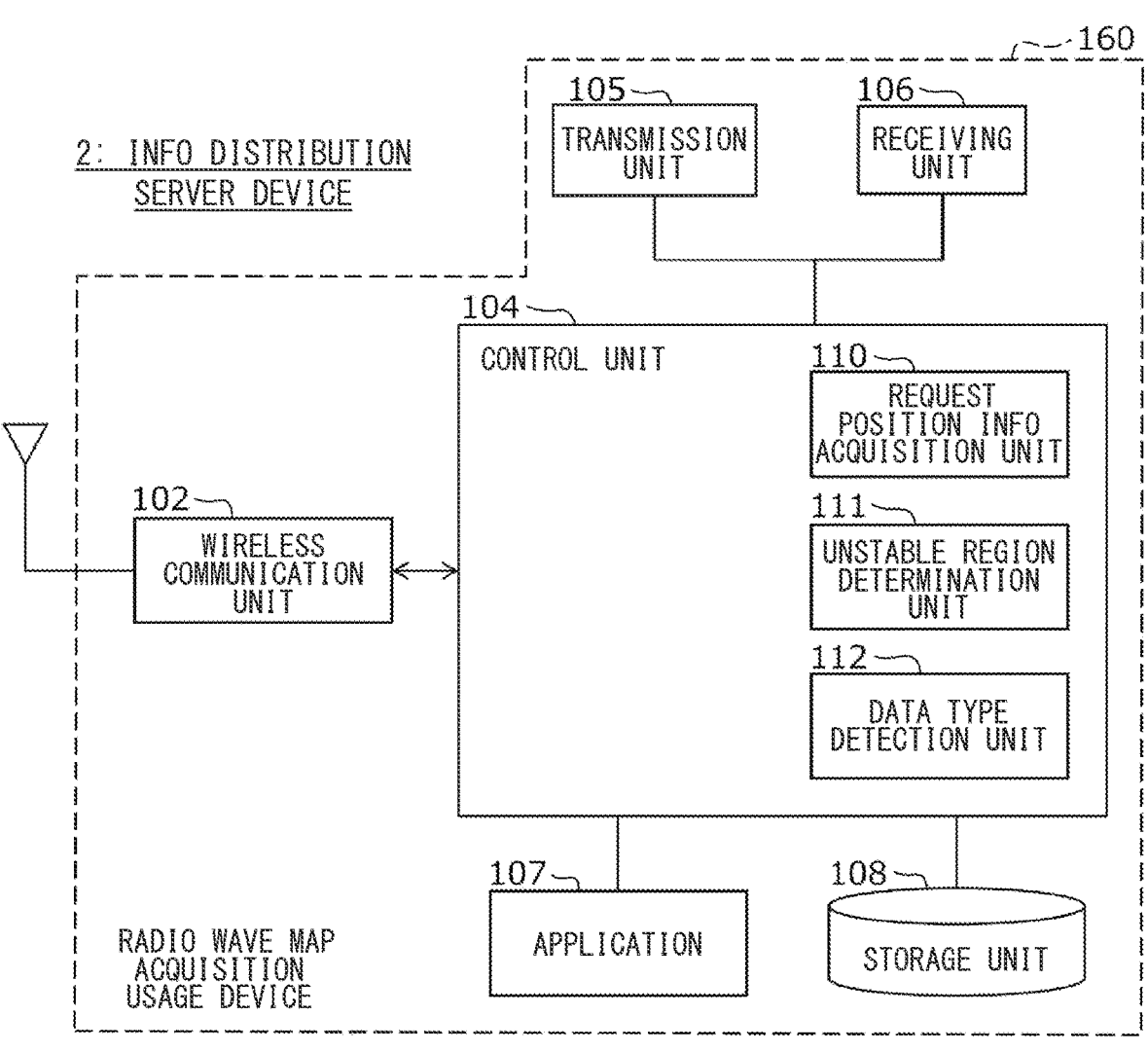
FIG. 16 is a block diagram illustrating a configuration example of a radio wave map acquisition usage device which is an information distribution server device according to a second embodiment of the present disclosure.

FIG. 16 shows a configuration of the radio wave map acquisition usage device 160 of the present embodiment. FIG. 16 is different from FIG. 2 used in the description of the first embodiment in that there is no configuration corresponding to the probe information transmission device 100.

Hereinafter, parts different from those of the first embodiment will be described, configurations similar to those of FIG. 2 of the first embodiment will be given the same reference numerals in the drawings, and the description of the first embodiment will be cited.

The request position information acquisition unit 110 specifies a physical position of the in-vehicle device 1 that is a communication partner, determines the physical position as a request position, and "acquires" "request position information". Specifically, position information is received from the in-vehicle device 1, and the position information is used as the request position information.

In addition to the position information received from the in-vehicle device 1, speed information and traveling direction information may be received. Accordingly, it is possible to predict a future travel position of the in-vehicle device 1 and use the predicted position as the request position information.

The transmission unit 105 transmits, to the radio wave map provision device 250, a radio wave map request including the request position information generated and acquired by the request position information acquisition unit 110.

In the present embodiment, a downlink-radio wave map is requested for the purpose of transmission control when data is transmitted from the information distribution server device 2 to the in-vehicle device 1.

The receiving unit 106 receives the radio wave map reply from the radio wave map provision device 250. Since the radio wave map provision device 250 is the same as the radio wave map provision device 250 described in the first embodiment, the description of the first embodiment will be cited.

The application 107 is an application that uses the wireless communication unit 102. For example, a program for transmitting map data used in a navigation system or update data of the application may be used.

As described above, according to the radio wave map acquisition usage device 160 of the present embodiment, an influence on communication in an unstable region can be minimized by controlling wireless communication with a terminal device 1 via the base station device 4 based on a determination result of the unstable region determination unit 111.

In addition, by controlling the wireless communication with the terminal device 1 with the base station device 4 based on the data type of the data to be transmitted in addition to the determination result of the unstable region determination unit 111, the control of the wireless communication in the unstable region can be adaptively changed according to the data type.

Since the modifications of the first embodiment can also be applied to the second embodiment, the modifications of the first embodiment will be cited.

7. THIRD EMBODIMENT

The radio wave map acquisition usage device 160 of the second embodiment is implemented by the information distribution server device 2, and the radio wave map acquisition usage device 160 may be mounted on a vehicle that is a moving object, and transmit data to another vehicle.

Figure 17:
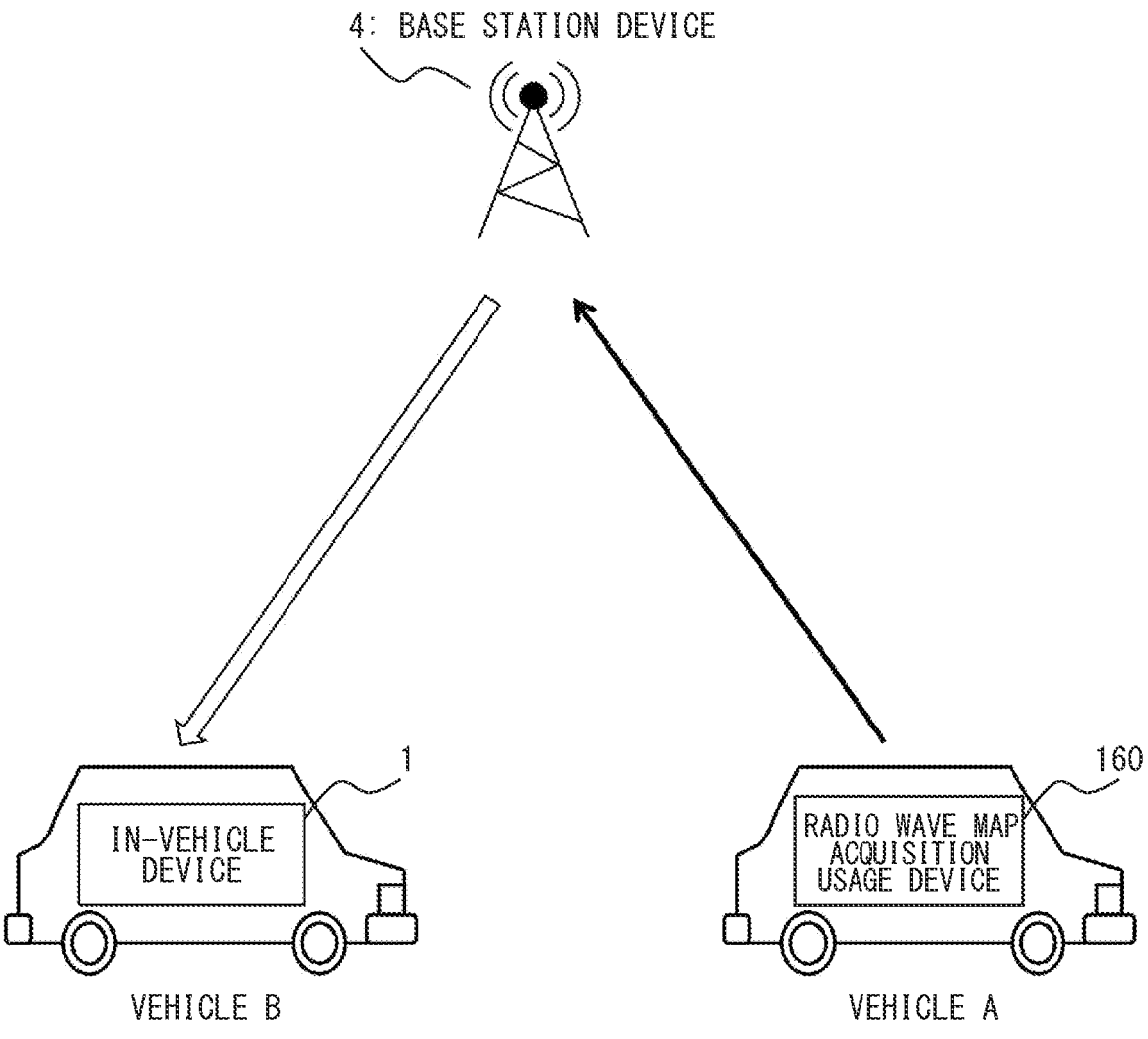
FIG. 17 is a diagram illustrating a relation between a radio wave map acquisition usage device, which is an in-vehicle device, and another in-vehicle device according to a third embodiment of the present disclosure.

In FIG. 17, the radio wave map acquisition usage device 160 mounted on a vehicle A transmits data to a vehicle B, which is another vehicle, via the base station device 4. In this case, the radio wave map acquisition usage device 160 having the same configuration as that of the second embodiment shown in FIG. 16 can also be used. In this case, a downlink-radio wave map may be requested for the purpose of transmission control when data is transmitted to the in-vehicle device 1 via the base station device 4. Further, an uplink-radio wave map may also be requested as in the first embodiment when data is transmitted from the vehicle A to the base station device 4.

8. OTHER EMBODIMENTS

In the first embodiment, the radio wave map server device 5 generates and provides a radio wave map, and the terminal device 1 generates probe information and acquires/uses the radio wave map, and these operations may be performed integrally. That is, all of these functions may be provided in the terminal device 1. In this case, the terminal device 1 generates, accumulates, and uses the radio wave map to be used by the device.

9. CONCLUSIONS

As described above, features of the probe information transmission device, the radio wave map generation device, the radio wave map provision device, and the radio wave map acquisition usage device according to the embodiments of the present disclosure have been described above.

Since terms used in the embodiments are examples, the terms may be replaced with synonymous terms or terms including synonymous functions.

The block diagrams used for the description of the embodiments are obtained by classifying and organizing the configurations of the devices for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there is no restrictions such as a relation in which results of preceding steps are used in one other step.

The terms such as first, second, to N-th (where N is an integer) used in the embodiments and in the claims are used to distinguish two or more similar configurations and methods and are not intended to limit the order or superiority.

The embodiments are based on the probe information transmission device or the radio wave map acquisition usage device mounted on the vehicle, and the present disclosure also includes a dedicated or general-purpose device other than a vehicle device, unless otherwise specified within the claims.

The embodiments have been described on the premise that the probe information transmission device or the radio wave map acquisition usage device disclosed in the embodiments is mounted on the vehicle, and the embodiments may be on the premise that a pedestrian carries the probe information transmission device or the radio wave map acquisition usage device.

Examples of forms of the devices of the present disclosure include the following forms.

Examples of a form of a component include a semiconductor device, an electronic circuit, a module, and a microcomputer.

Examples of a form of a semi-finished product include an electric control unit (ECU) and a system board.

Examples of a form of a finished product include a cellular phone, a smartphone, a tablet computer, a personal computer (PC), a workstation, and a server.

In addition, the devices may include a device having a communication function or the like, and examples thereof include a video camera, a still camera, and a car navigation system.

Necessary functions such as an antenna or a communication interface may be added to each device.

It is defined that the radio wave map generation device and the radio wave map provision device of the present disclosure may be used to provide various services. In conjunction with providing such services, the devices of the present disclosure are used, the method of the present disclosure is used, or/and the program of the present disclosure is executed.

The present disclosure can be implemented not only by dedicated hardware having the configurations and functions described in the embodiments, but also by a combination of a program, which is recorded on a recording medium such as a memory or a hard disk and is used for implementing the present disclosure, and general-purpose hardware that has a dedicated or general-purpose CPU that can execute the program, a memory, and the like.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Accordingly, the latest functions can be provided at all times through program upgrade.

The probe information transmission device and the radio wave map acquisition usage device of the present disclosure have been described as a vehicle-electric control unit mounted mainly on an automobile, and the present disclosure is applicable to all moving objects in general, such as a motorcycle, a bicycle with an electric motor, a railway vehicle, a pedestrian, a ship, and an aircraft.

In addition, the present disclosure is applicable to devices used for various applications such as a cellular phone, a tablet computer, and a game machine.

What is claimed is:

1. A radio wave map provision device that receives a radio wave map request from a radio wave map acquisition usage device and transmits necessary information, the radio wave map provision device comprising:
   a radio wave map storage unit storing a radio wave map, the radio wave map including reference position information indicating a reference position, a communication speed with each of a plurality of external communication devices at the reference position, and a connection probability indicating a probability of performing wireless communication with each of the plurality of external communication devices at the reference position;
   a receiving unit receiving the radio wave map request including request position information indicating a request position;
   a lowest guaranteed speed calculation unit obtaining a lowest guaranteed speed at the reference position based on the communication speed and the connection probability;
   an estimated speed calculation unit obtaining an estimated speed at the reference position based on the communication speed and the connection probability; and
   a transmission unit transmitting a radio wave map reply including the connection probability, the lowest guaranteed speed, and the estimated speed, at the reference position corresponding to the request position information.

2. A radio wave map provision device that receives a radio wave map request from a radio wave map acquisition usage device and transmits necessary information, the radio wave map provision device comprising:
   a radio wave map storage unit storing a radio wave map, the radio wave map including reference position information indicating a reference position, a communication speed with each of a plurality of external communication devices at the reference position, and a connection probability indicating a probability of performing wireless communication with each of the plurality of external communication devices at the reference position;
   a receiving unit receiving the radio wave map request including request position information indicating a request position; and
   a transmission unit transmitting a radio wave map reply including the communication speed and the connection probability, at the reference position corresponding to the request position information.

3. A radio wave map provision device that receives a radio wave map request from a radio wave map acquisition usage device and transmits necessary information, the radio wave map provision device comprising:
   a radio wave map storage unit storing a radio wave map, the radio wave map including reference position information indicating a reference position, a communication speed with each of a plurality of external communication devices at the reference position, and a connection probability indicating a probability of performing wireless communication with each of the plurality of external communication devices at the reference position;

a receiving unit receiving the radio wave map request including request position information indicating a request position;
   a lowest guaranteed speed calculation unit obtaining a lowest guaranteed speed at the reference position based on the communication speed and the connection probability;
   an estimated speed calculation unit obtaining an estimated speed at the reference position based on the communication speed and the connection probability;
   an unstable region determination unit determining whether the reference position is in an unstable region based on the connection probability; and
   a transmission unit transmitting a radio wave map reply including the connection probability, the lowest guaranteed speed, and the estimated speed, at the reference position corresponding to the request position information, and information indicating whether the reference position is in the unstable region.

4. A radio wave map provision device that receives a radio wave map request from a radio wave map acquisition usage device and transmits necessary information, the radio wave map provision device comprising:
   a radio wave map storage unit storing a radio wave map, the radio wave map including reference position information indicating a reference position, a communication speed with each of a plurality of external communication devices at the reference position, and a connection probability indicating a probability of performing wireless communication with each of the plurality of external communication devices at the reference position;
   a receiving unit receiving the radio wave map request including request position information indicating a request position;
   an unstable region determination unit determining whether the reference position is in an unstable region based on the connection probability; and
   a transmission unit transmitting a radio wave map reply including the communication speed and the connection probability, at the reference position corresponding to the request position information, and information indicating whether the reference position is in the unstable region.

5. The radio wave map provision device according to claim 1, wherein
   the lowest guaranteed speed calculation unit determines a minimum value of the communication speed as the lowest guaranteed speed under a condition that the connection probability is equal to or more than a predetermined threshold.

6. A radio wave map acquisition usage device comprising:
   a request position information acquisition unit acquiring request position information indicating a request position;
   a transmission unit transmitting a radio wave map request including the request position information to a radio wave map provision device;
   a receiving unit receiving a radio wave map reply from the radio wave map provision device, wherein the radio wave map reply includes
      a connection probability indicating a probability of performing wireless communication with each of a plurality of external communication devices at a reference position corresponding to the request position information, a lowest guaranteed speed at the reference position obtained based on the connection probability and a communication speed with each of the plurality of external communication devices at the reference position, and an estimated speed at the reference position obtained based on the communication speed and the connection probability;

an unstable region determination unit determining whether the reference position is in an unstable region based on the connection probability;

a communication control unit controlling the wireless communication with each of the plurality of external communication devices based on a determination result of the unstable region determination unit; and a wireless communication unit transmitting data by performing the wireless communication with the plurality of external communication devices.

7. A radio wave map acquisition usage device comprising:

a request position information acquisition unit acquiring request position information indicating a request position;

a transmission unit transmitting a radio wave map request including the request position information to a radio wave map provision device;

a receiving unit receiving a radio wave map replay from the radio wave map provision device, wherein the radio wave map reply includes a communication speed with each of a plurality of external communication devices at a reference position corresponding to the request position information, and a connection probability indicating a probability of performing wireless communication with each of the plurality of external communication devices at the reference position;

an unstable region determination unit determining whether the reference position is in an unstable region based on the connection probability;

a communication control unit controlling the wireless communication with each of the plurality of external communication devices based on a determination result of the unstable region determination unit; and a wireless communication unit transmitting data by performing the wireless communication with the plurality of external communication devices.

8. A radio wave map acquisition usage device comprising:

a request position information acquisition unit acquiring request position information indicating a request position;

a transmission unit transmitting a radio wave map request including the request position information to a radio wave map provision device;

a receiving unit receiving a radio wave map replay from the radio wave map provision device, wherein the radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the plurality of external communication devices at the reference position, an estimated speed at the reference position obtained based on the communication speed and the connection probability, and information indicating whether the reference position is in an unstable region, which is obtained based on the connection probability;

a communication control unit controlling the wireless communication with each of the plurality of external communication devices based on the information indicating whether the reference position is in the unstable region; and a wireless communication unit transmitting data by performing the wireless communication with the plurality of external communication devices.

9. A radio wave map acquisition usage device comprising:

a request position information acquisition unit acquiring request position information indicating a request position;

a transmission unit transmitting a radio wave map request including the request position information to a radio wave map provision device;

a receiving unit receiving a radio wave map replay from the radio wave map provision device, wherein the radio wave map reply includes a communication speed with each of a plurality of external communication devices at a reference position corresponding to the request position information, a connection probability indicating a probability of performing wireless communication with each of the plurality of external communication devices at the reference position, and information indicating whether the reference position is in an unstable region, which is obtained based on the connection probability;

a communication control unit controlling the wireless communication with each of the plurality of external communication devices based on the information indicating whether the reference position is in the unstable region; and a wireless communication unit transmitting data by performing the wireless communication with the plurality of external communication devices.

10. The radio wave map acquisition usage device according to claim 7, further comprising:

a lowest guaranteed speed calculation unit obtaining a lowest guaranteed speed at the reference position based on the communication speed and the connection probability; and an estimated speed calculation unit obtaining an estimated speed at the reference position based on the communication speed and the connection probability.

11. The radio wave map acquisition usage device according to claim 6, wherein the unstable region determination unit determines that the reference position is in the unstable region when a maximum value of the connection probability is equal to or less than a predetermined threshold.

12. The radio wave map acquisition usage device according to claim 6, further comprising:

a data type detection unit detecting a data type indicating a feature of the data, wherein the communication control unit controls the wireless communication with each of the plurality of external communication devices based on the data type detected by the data type detection unit in addition to the determination result of the unstable region determination unit or the information indicating whether the reference position is in the unstable region.

13. The radio wave map acquisition usage device according to claim 12, wherein when the reference position is in the unstable region and the data type detected by the data type detection unit is communication delay allowance data that allows communication delay, the communication control unit instructs the wireless communication unit to stop transmitting the communication delay allowance data.

14. The radio wave map acquisition usage device according to claim 12, wherein when the reference position is in the unstable region and the data type detected by the data type detection unit is real-time data that does not allow communication delay, the communication control unit instructs the wireless communication unit to transmit the real-time data at the lowest guaranteed speed.

15. The radio wave map acquisition usage device according to claim 12, wherein when the reference position is in the unstable region and the data type detected by the data type detection unit is urgent data having an urgency of information transmission, the communication control unit instructs the wireless communication unit to transmit the urgent data at the estimated speed.

16. The radio wave map acquisition usage device according to claim 6, wherein the radio wave map acquisition usage device is mounted on a moving object.

17. The radio wave map acquisition usage device according to claim 6, wherein the request position information acquisition unit acquires position information transmitted from a terminal device mounted on a moving object.

18. A radio wave map provision method executed by a radio wave map provision device that receives a radio wave map request from a radio wave map acquisition usage device and transmits necessary information, the radio wave map provision device including a radio wave map storage unit that stores a radio wave map, the radio wave map including reference position information indicating a reference position, a communication speed with each of a plurality of external communication devices at the reference position, and a connection probability indicating a probability of performing wireless communication with each of the plurality of external communication devices at the reference position, the radio wave map provision method comprising:

receiving the radio wave map request including request position information indicating a request position;

obtaining a lowest guaranteed speed at the reference position based on the communication speed and the connection probability;

obtaining an estimated speed at the reference position based on the communication speed and the connection probability; and transmitting a radio wave map reply including the connection probability, the lowest guaranteed speed, and the estimated speed, at the reference position corresponding to the request position information.

19. A radio wave map acquisition usage method executed by a radio wave map acquisition usage device, the radio wave map acquisition usage method comprising:

acquiring request position information indicating a request position;

transmitting a radio wave map request including the request position information to a radio wave map provision device;

receiving a radio wave map replay from the radio wave map provision device, wherein the radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the plurality of external communication devices at the reference position, and an estimated speed at the reference position obtained based on the communication speed and the connection probability;

determining whether the reference position is in an unstable region based on the connection probability;

controlling the wireless communication with each of the plurality of external communication devices based on a determination result; and transmitting data by performing the wireless communication with the plurality of external communication devices.

20. A radio wave map provision program product stored in a computer-readable non-transitory storage medium, the radio wave map provision program product comprising instructions to be executed by at least one processor of a radio wave map provision device, which receives a radio wave map request from a radio wave map acquisition usage device and transmits necessary information, the radio wave map provision device including a radio wave map storage unit that stores a radio wave map, the radio wave map including reference position information indicating a reference position, a communication speed with each of a plurality of external communication devices at the reference position, and a connection probability indicating a probability of performing wireless communication with each of the plurality of external communication devices at the reference position, the instructions comprising:

receiving the radio wave map request including request position information indicating a request position;

obtaining a lowest guaranteed speed at the reference position based on the communication speed and the connection probability;

obtaining an estimated speed at the reference position based on the communication speed and the connection probability; and transmitting a radio wave map reply including the connection probability, the lowest guaranteed speed, and the estimated speed, at the reference position corresponding to the request position information.

21. A radio wave map acquisition usage program product stored in a computer readable non-transitory storage medium, the radio wave map acquisition usage program product comprising instructions to be executed by at least one processor of a radio wave map acquisition usage device, the instructions comprising:

acquiring request position information indicating a request position;

transmitting a radio wave map request including the request position information to a radio wave map provision device;

receiving a radio wave map reply from the radio wave map provision device, wherein the radio wave map reply includes a connection probability indicating a probability of performing wireless communication with each of a plurality of external communication devices at a reference position corresponding to the request position information, a lowest guaranteed speed at the reference position obtained based on the connection probability and a communication speed with each of the external communication devices at the reference position, and an estimated speed at the reference position obtained based on the communication speed and the connection probability;

determining whether the reference position is in an unstable region based on the connection probability;

controlling the wireless communication with each of the plurality of external communication devices based on a determination result; and transmitting data by performing the wireless communication with the plurality of external communication devices.

* * * * *